AUTOMATIC LINE TESTING APPARATUS

Filed June 26, 1964 13 Sheets-Sheet 1

INVENTOR
V. E. MUNSON
BY [signature]
ATTORNEY

Dec. 26, 1967 V. E. MUNSON 3,360,617

AUTOMATIC LINE TESTING APPARATUS

Filed June 26, 1964 13 Sheets-Sheet 3

Dec. 26, 1967 V. E. MUNSON 3,360,617

AUTOMATIC LINE TESTING APPARATUS

Filed June 26, 1964 13 Sheets-Sheet 6

Dec. 26, 1967 V. E. MUNSON 3,360,617

AUTOMATIC LINE TESTING APPARATUS

Filed June 26, 1964 13 Sheets-Sheet 7

Dec. 26, 1967 V. E. MUNSON 3,360,617

AUTOMATIC LINE TESTING APPARATUS

Filed June 26, 1964 13 Sheets-Sheet 13

United States Patent Office 3,360,617
Patented Dec. 26, 1967

3,360,617

AUTOMATIC LINE TESTING APPARATUS

Verne E. Munson, Manasquan, N.J., assignor to Bell Telephone Laboratories, Incorporated, New York, N.Y., a corporation of New York Filed June 26, 1964, Ser. No. 378,196
11 Claims. (Cl. 179—175.3)

This invention relates to circuit testing arrangements and more particularly to automatic alarm testing systems that are employed for inspecting and recording the condition of alarm devices such as pressure-responsive contactors in telephone exchange cables for example.

Telephone exchange cables are typically made up of a plurality of conductor pairs connecting telephone substcribers to their local central office or connecting one central office to another. The steady growth of the telephone plant and the attendant increase in the number and complexity of telephone exchange cable networks have stimualted repeated demands for improved exchange cable maintenance techniques that will reduce the incidence of cable faults as well as over-all maintenance costs.

One exchange cable maintenance system that has been employed with considerable success is based on the employment of dry air or nitrogen gas under pressure within the exchange cable sheath. In such a system if cracks or other small openings develop in the cable sheath, the outward flow of gas prevents moisture from entering. If the break or rupture is not repaired promptly, however, the opening generally expands and as a consequence the gas pressure in the cable may be reduced to a point at which moisture is no longer prevented from entering—with resulting damage to the cable.

To prevent serious exchange cable faults of the type described, gas pressure in the cable must be monitored at frequent intervals. An effective monitoring system must therefore include means for detecting significant changes in cable pressure and also means for indicating the location of the underlying cable fault. The detecting function in a monitoring system may be effected by a pressure-responsive contactor device. The contactor is pneumatically connected to the cable and its output terminals are wired to a subscriber's line within the cable. When the pressure drops to some predetermined level below normal, a set of contacts is operated to place a relatively high resistance bridge across an associated telephone subscriber's line. Suitable resistance measuring apparatus is employed at the proper subscriber line terminations at the central office to determine whether line resistances have changed from their normal values. In this fashion, the approximate physical location of a cable fault may readily be established. More sophisticated arrangements, such as that discolsed by W. A. Winckelmann in a copending application filed on July 30, 1963, Ser. No. 298,770, now U.S. Patent No. 3,259,892 provide means for measuring various ranges of pressure in a cable at preselcted locations. The pressure ranges are represented electrically by corresponding resistance ranges or "bands" exhibited by pressure responsive transducers and contactors disposed across selected lines in the pressurized cables. Electrical detecting devices located at the central office are utilized to determine the particular deviations from normal line pressures.

In order to eliminate the time-consuming and costly procedure of testing each line manually various systems are employed for automatically monitoring the condition of the pressure-responsive contactors and transducers in exchange cables. One illustrative system of this type is disclosed in U.S. Patent 3,082,299 issued to G. A. Reter, Mar. 19, 1963. The obvious advantages inherent in automatic monitoring have not hereto fore been fully attained, however, inasmuch as known systems of this type still require a susbtantial amount of manual supervision. For example, if an operated contactor is encountered or if the subscriber's line associated with a particular contactor is busy at the time of test during an automatic testing sequence, the operation of the testing apparatus is stopped automatically and manual action is required to restart it. Adidtionally, known systems of the type described are unduly complex, giving rise to inherent maintenance problems which in effect serve to reduce the cost-saving advantages that such systems are designed to bring about.

Accordingly, one object of the invention is to reduce the manual supervision required in automatic line testing arrangements.

Another object is to reduce the complexity of systems which provide for the automatic detection and monitoring of pressure-responsive contactors in exchange cable networks.

A further object is to reduce the cost of automatic line testing arrangements.

These and other objects are achieved in accordance with the principles of the invention by automatic detection and monitoring equipment that may be programmed for the automatic sequential testing of a group of exchange cable pressure-responsive contactors without interruption irrespective of whether operated contactors or busy line conditions are encountered in the course of the test sequence. Additionally, in the course of a test sequence a record is automatically prepared indicating the identity of each operated contactor encountered as well as the identity of any contactor line found to be busy. Further, in accordance with the invention, the equipment is automatically returned to its initial or start condition upon the completion of a test sequence. The record of the conditions indicated that is prepared automatically during the course of a test sequence may then be consulted by the attending technician at his convenience and as a result he may pursue other duties without interruption while the entire test sequence is being conducted.

One embodiment of a testing system in accordance with the invention includes two principal circuits, namely, a test control circuit and a dial and record circuit. The latter circuit, in response to appropriate ordering signals, effects a connection through to the line under test, conducts the actual testing of the associated contactor or transducer and returns an indication of the test results to the dial and record circuit. The dial and record circuit includes a control unit or console that houses all the necessary relays, controls and signal lamps for administering the recording and playback sequences and for conducting checking routines and automatic operation of the test program.

An additional element of the dial and record circuit is a recorder-reproducer unit that includes a trouble recorder, a test program recorder, an amplifier and associated control relays. One aspect of the invention involves the unique interrelation of these recording units. The sequencing and logic of a test program is stored in the form of control tones recorded on one track of the program recorder in combination with tones recorded on the second track. Coding is established by the sequence and duration of these recorded tones. The test program itself or the identification of each station to be tested is stored on the second track of the program recorder in the form of tone signals. A recorded verbal identification follows each test number. A single tone generating oscillator is uniquely employed to perform a dual function in that it provides tone for recording control signals on the control track of the program recorder and also provides pulsed tones in response to dialing for recording on the dial and speech track.

A single track magnetic tape recording is used to make the trouble record. In accordance with the invention, the verbal identification of this test number is dubbed from the program tape to the trouble tape whenever a called line is busy or when a test results in the discovery of a fault.

An additinoal function built into the control logic in accordance with the invention is the interruption of the test program whenever the trouble recorder reaches its recording capacity. Additionally, remote playback facilities are enabled and an operator is alerted to play the trouble recording. Remote control means also provide for remote monitoring while an automatic test program is in progress and for remote playback of the trouble recording when a test program is not in progress.

Accordingly, one feature of the invention pertains to line testing apparatus that includes a means for recording an entire test program for the control of an uninterrupted automatic cycle irrespective of the particular line condition uncovered by the applied test.

Another feature relates to an arrangement for checking the recorded test program for accuracy and for correcting the program as required.

An additional feature lies in a system for recording verbal identification of each line to be placed under test and for automatically transferring to a second recording each recorded verbal identification that corresponds to a line fault or that corresponds to a busy line, a unique accompanying signal being automatically recorded in the latter instance to facilitate distinguishing a line fault condition from a line busy condition.

Another feature of the invention concerns the utilization of a dual purpose oscillator in an automatic line testing arrangement—first for generating tones of various durations in a preselected sequence, which tones are recorded on a first recording track to implement automatic control of a test program, and second for generating tones of uniform duration in response to dialing signals, which tones are recorded on a second recording track to provide address signaling of lines to be tested during the automatic test program sequence.

A further feature is an automatic arrangement for interrupting a test program in process and for alerting an operator in the event that the trouble recorder reaches its recording capacity.

These and other objects and features will be fully apprehended from the following detailed description of an illustrative embodiment of the invention and from the appended drawing in which.

Figure 1:
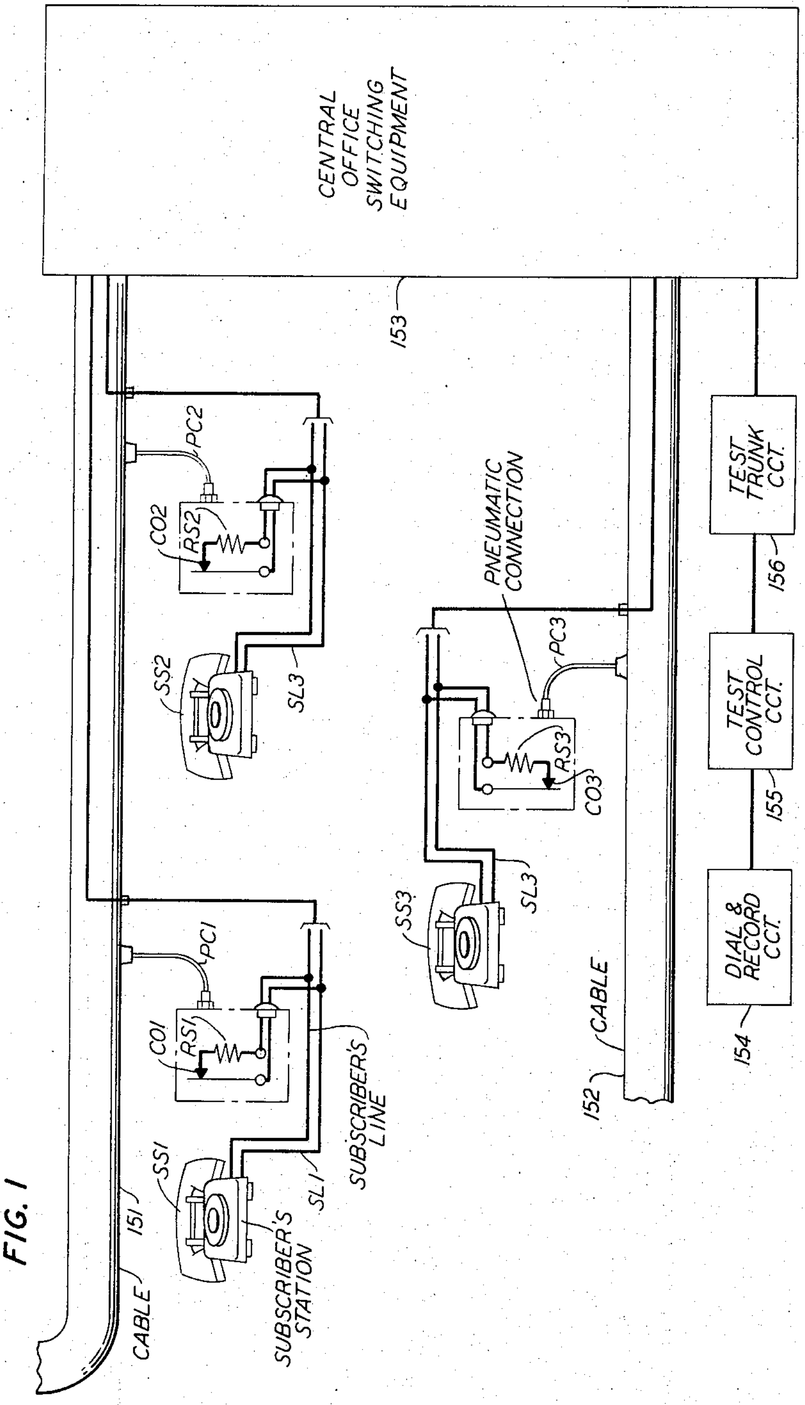
FIG. 1 is a block diagram of a line testing arrangement in accordance with the invention.
Figure 2:
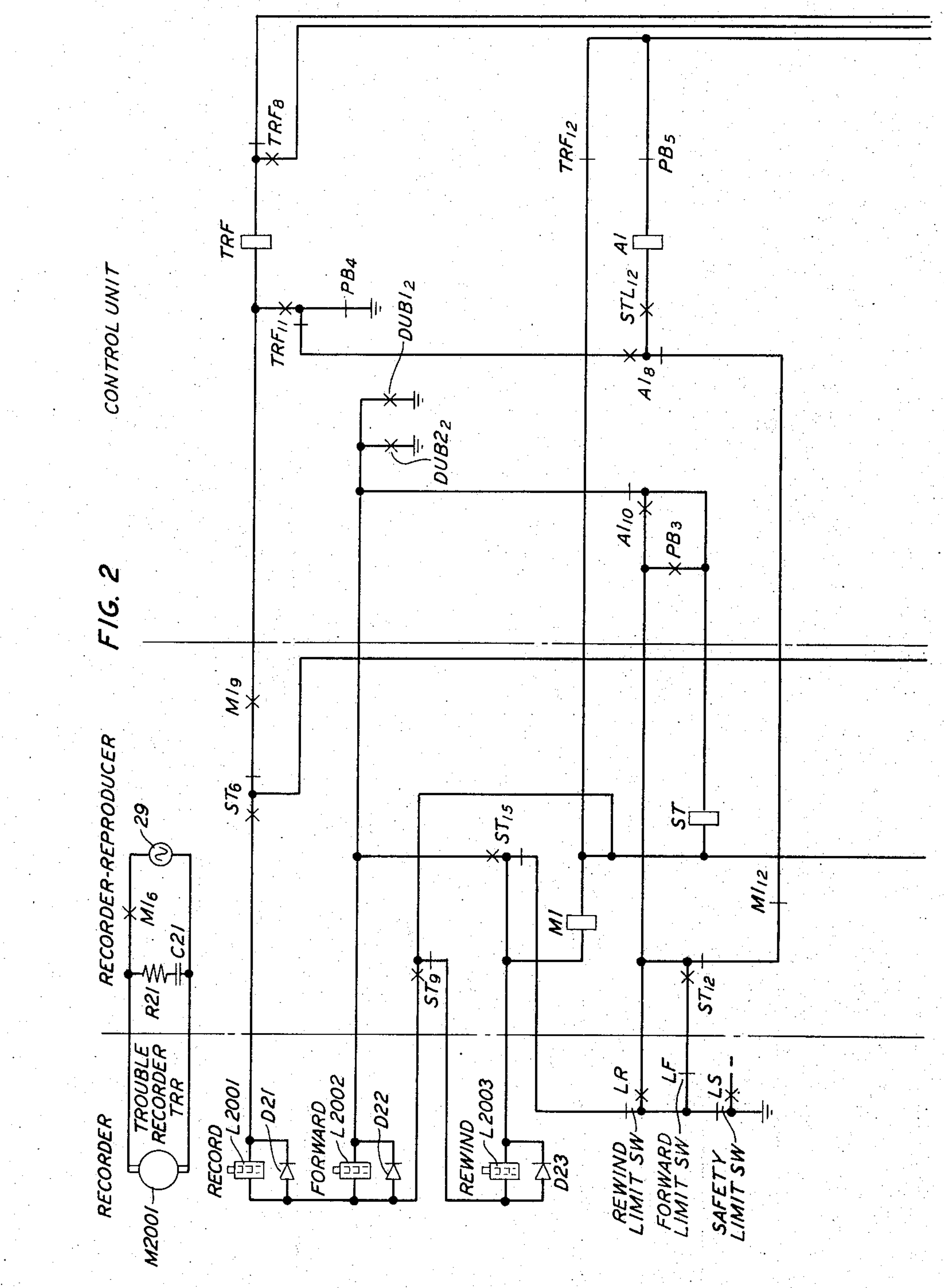
FIG. 2A is a sketch of the face of the operator's control unit, a part of the dial and record circuit shown in block form in FIG. 1.
Figures 3, 13:
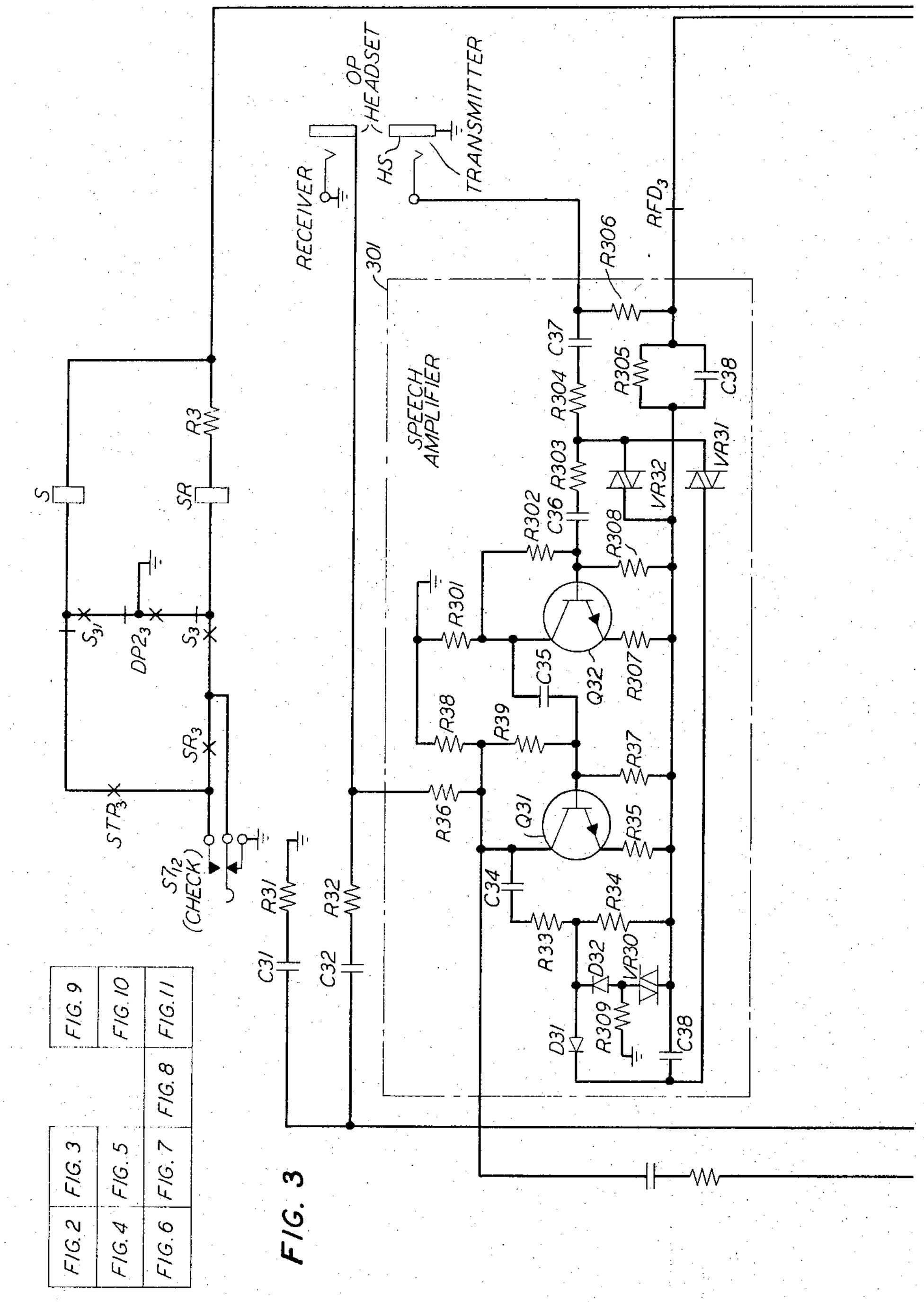
Figure 10:
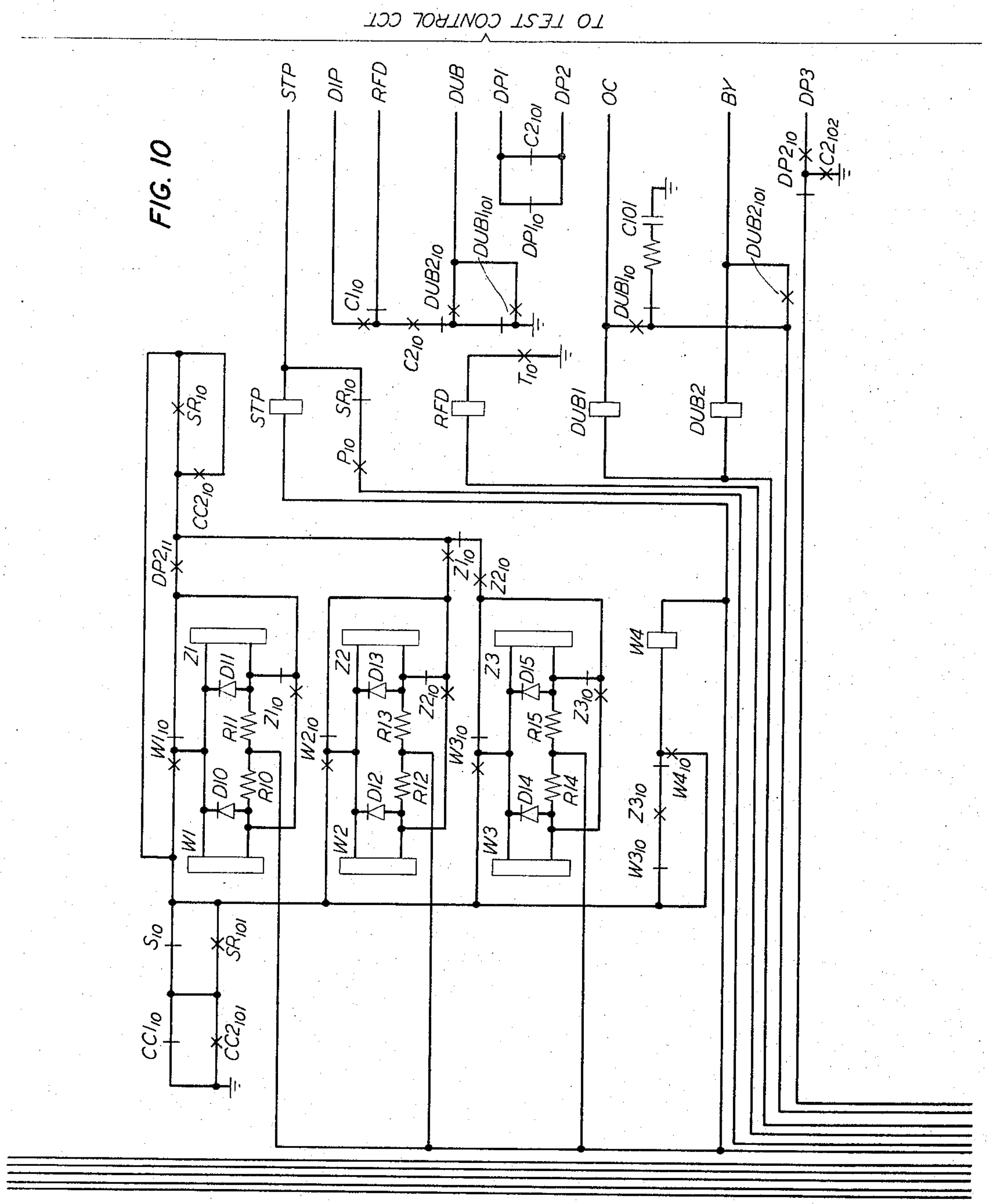
Figure 11:
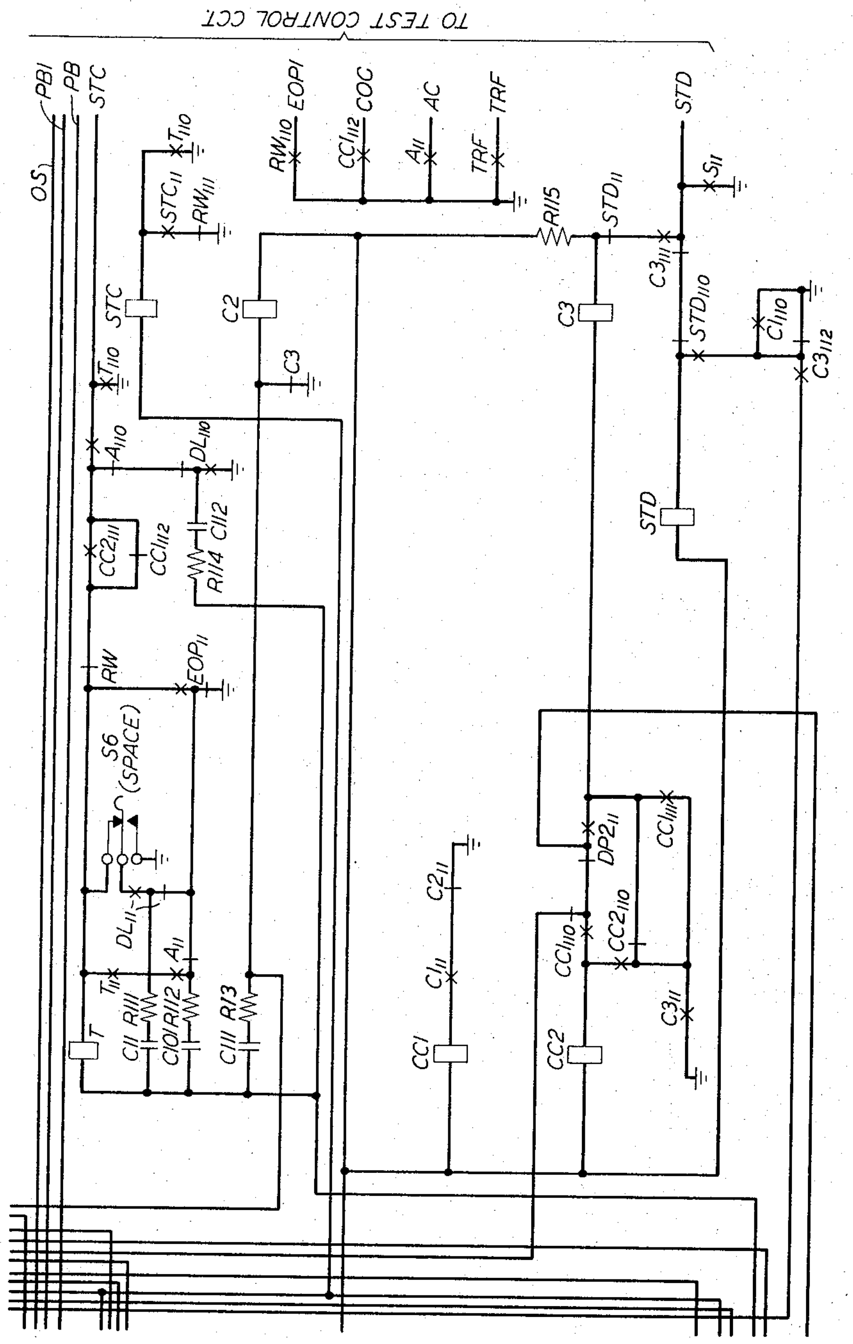
Figure 12:
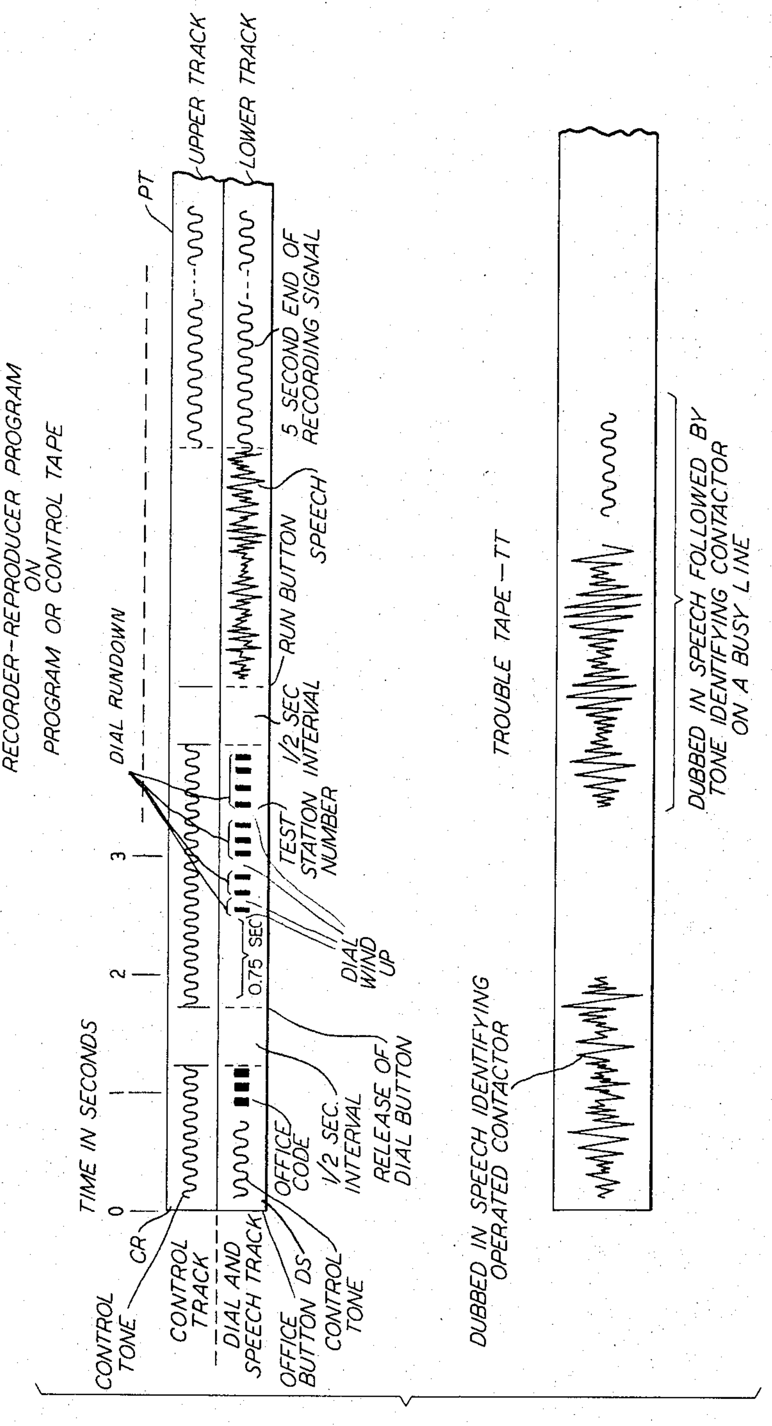

FIGS. 2 through 11 present a schematic circuit diagram of the dial and record circuit shown in block form in FIG. 1;

FIG. 12 shows a program or control tape and a trouble tape with illustrative signals recorded thereon; and FIG. 13 is a block diagram showing the relationship among FIGS. 2 through 11.

FIG. 1 illustrates the general type of pressurized cable telephone system to which the principles of the invention are applicable. Pressurized cables 151 and 152 are shown terminating in central office switching equipment 153. Subscriber station SS1 is served by subscriber's line SL1 which is a part of cable 151. Similarly, subscriber station SS2 is served by subscriber's line SL2 which is also a part of cable 151. If a fault occurs in the vicinity of subscriber station SS1, gas pressure applied to contractor CO1 by way of pneumatic connection PC1 is reduced, contactor CO1 operates and resistor RS1 is connected across subscriber's line SL1. Similarly, if a cable fault occurs in the vicinity of subscriber station SS2, gas pressure applied to contactor CO2 by way of pneumatic connection PC2 is reduced, contactor CO2 operates and resistor RS2 is placed across subscriber's line SL2. Subscriber station SS3, line SL3, contactor CO3, resistor RS3 and pneumatic connection PC3 relate to cable 152 in the same fashion as the corresponding elements described above relate to cable 151.

Dial and record circuit 154, wherein the principles of the instant invention reside, provides all of the necessary means for automatically initiating and conducting a test for the condition of contactors CO1, CO2 and CO3, as well as means for automatically recording the condition thereof. Test control circuit 155 controls the particular sequence of tests applied.

At the start of each test, the test control circuit 155 attaches the test train by means of test trunk circuit 156 to the particular office where subscribers' lines are located. Test control circuit 155 and test trunk circuit 156, although not described or shown in detail herein, are well known in the art, being shown, for example, in Patent 3,082,299 and in the copending application of Winckelmann, both cited above.

Figure 2A:
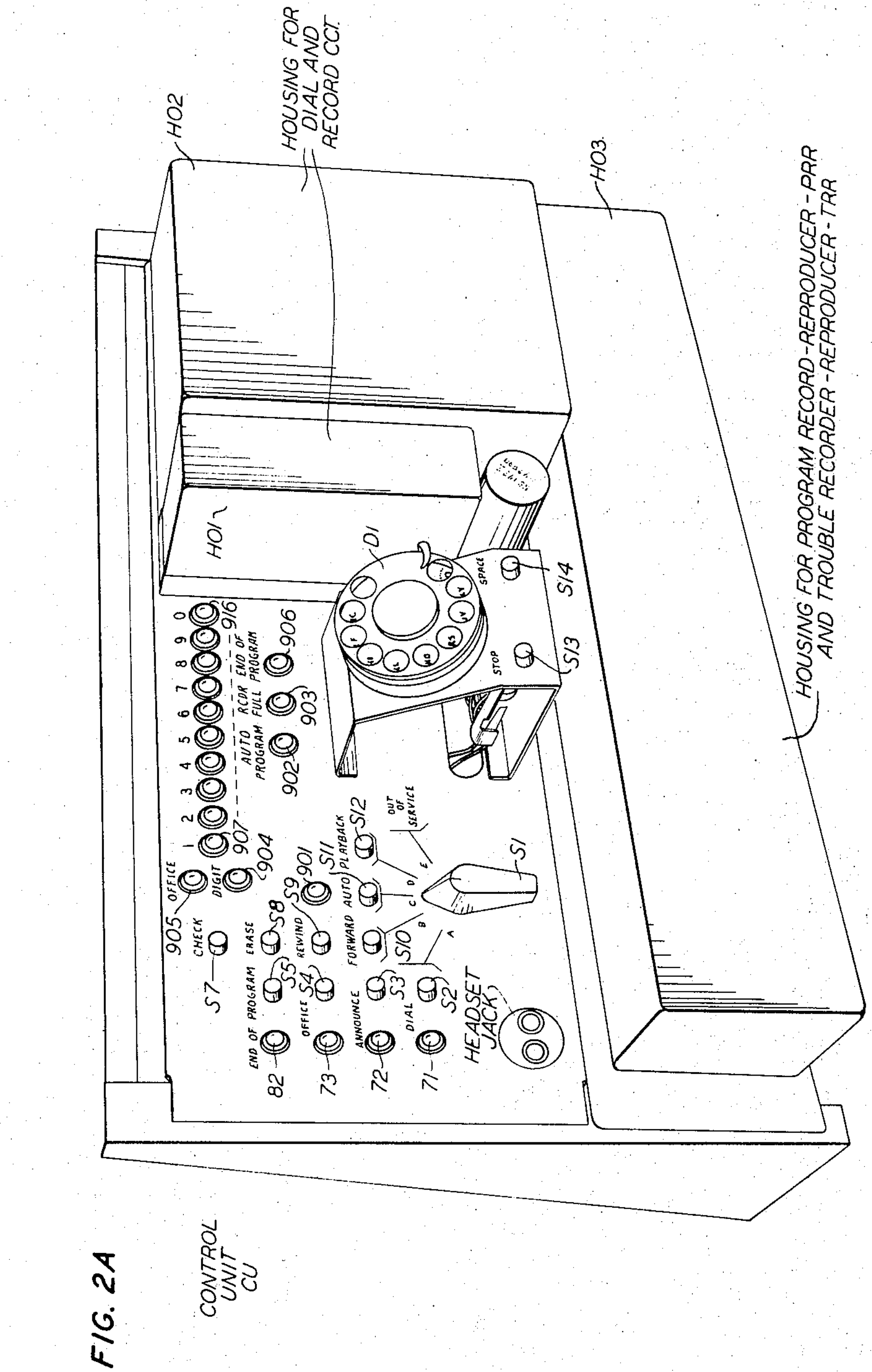

The basic housing and operating panel for dial and record circuit 154 is termed a control unit CU and is shown in FIG. 2A. Housing members HO1 and HO2 serve as covers for the relays and control circuitry which are a part of dial and record circuit 154. Similarly, housing unit HO3 provides a cover for a program recorder-reproducer PRR and for a trouble recorder-reproducer TRR. A master control switch S1 may be set manually to any one of five positions, A through E. The particular function of switch S1 and of control buttons S2, S3, S4, S5, S7, S8, S9, S10, S11 and S12 and their associated indicator lamps is described in detail in the following description of dial and record circuit 154, a schematic circuit diagram of which is shown in FIGS. 2 through 11.

Figure 4:
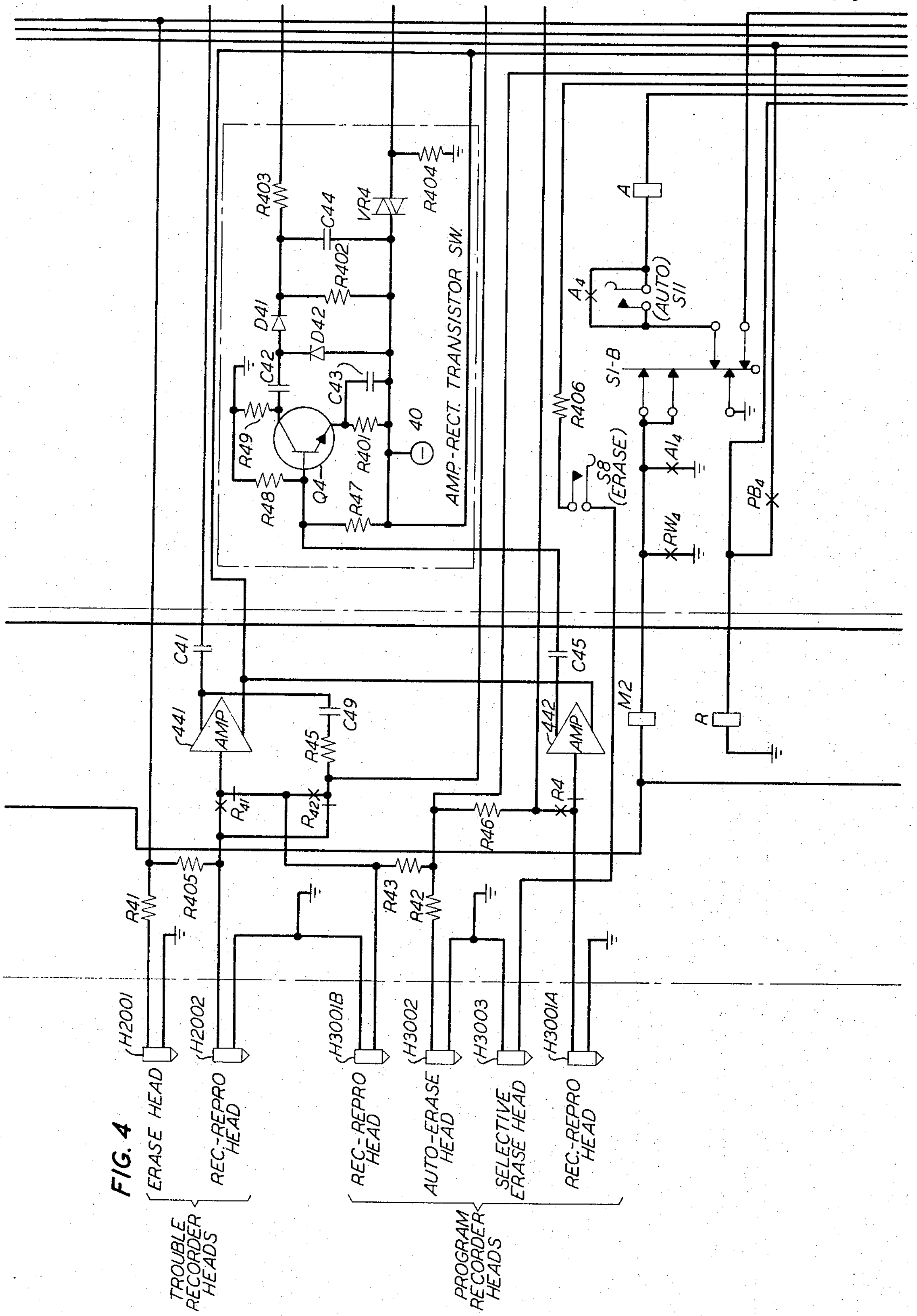
Figure 5:
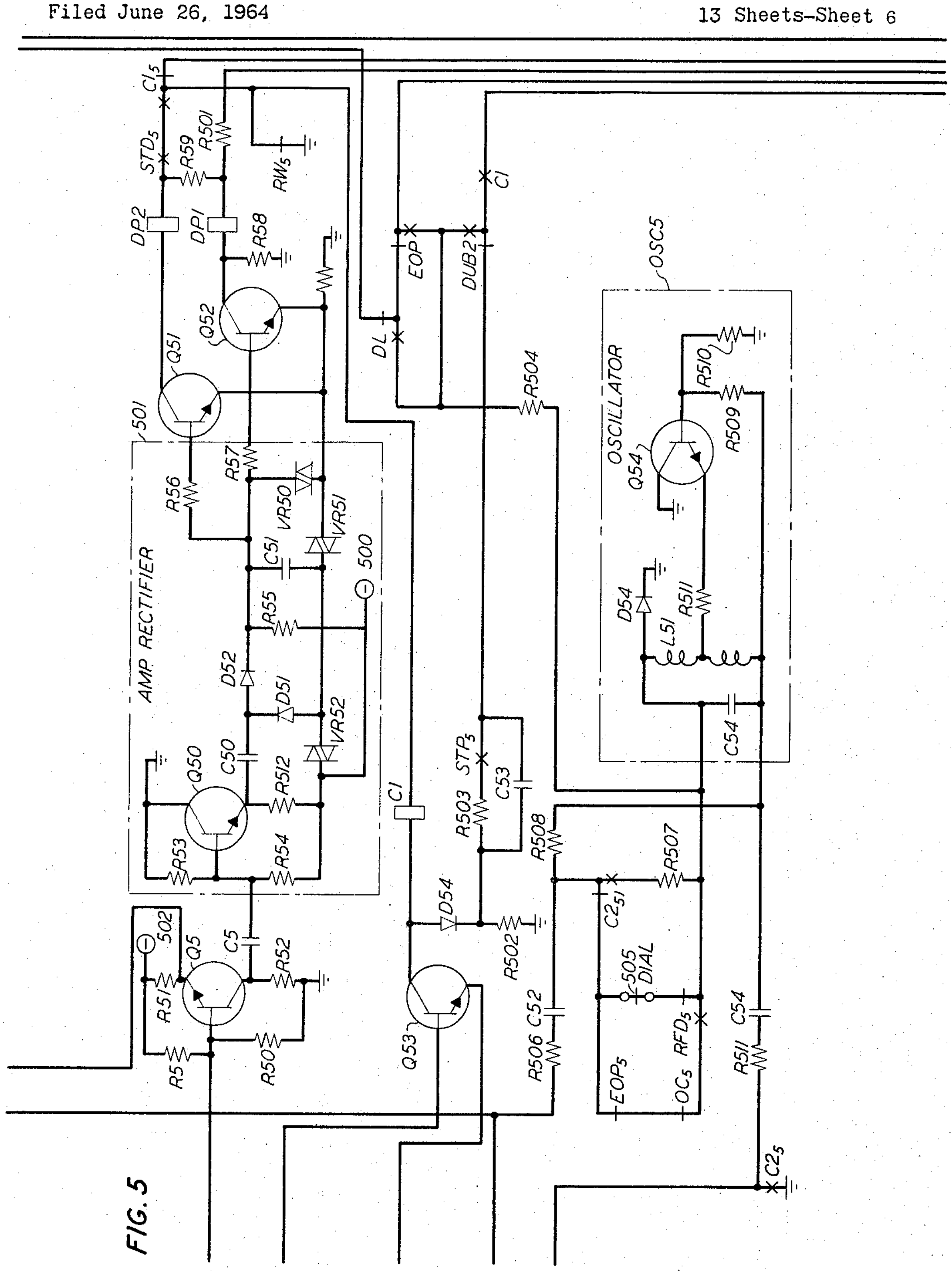
Figure 6:
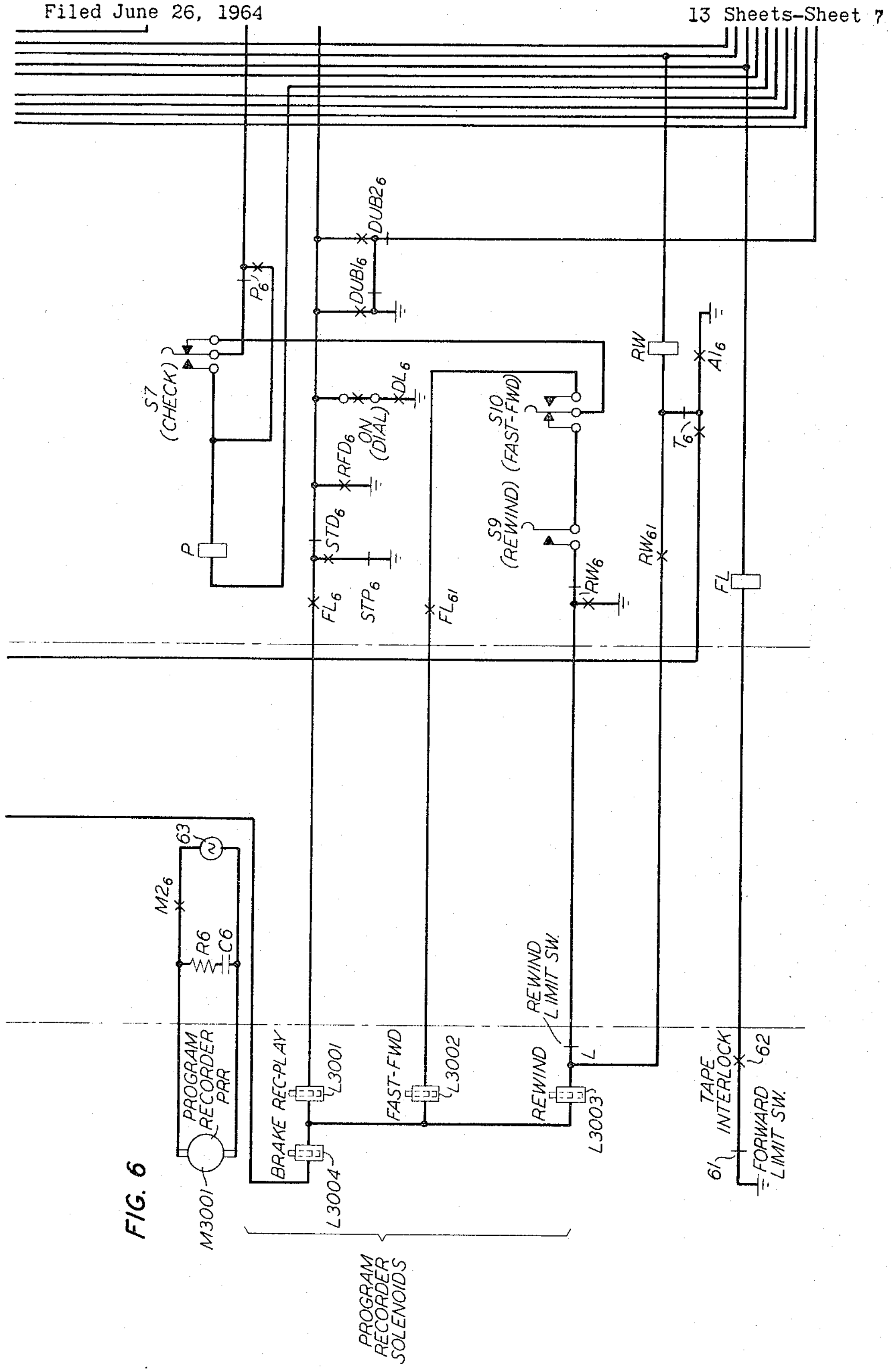

The schematic circuit diagram of the dial and record circuit 154 as shown in FIGS. 2 through 11 also includes schematic representations of certain key mechanical and structural elements of program recorder reproducer PRR and trouble recorder reproducer TRR. Thus, for example, FIG. 2 shows certain elements of trouble recorder TRR which include recorder motor M2001, a RECORD solenoid L2001, a FORWARD drive solenoid L2002 and a REWIND solenoid L2003. In FIG. 4, ERASE head H2001 and RECORD-REPRODUCE head H2002 are also a part of trouble recorder TRR. Parts of program recorder PRR, shown in FIG. 4, include RECORD-REPRODUCE head H3001B, AUTO ERASE head H3002, SELECTIVE ERASE head H3003, and RECORD-REPRODUCE head H3001A. Additional elements of program recorder PRR are shown in FIG. 6 and these include drive motor M3001, BRAKE solenoid L3004, RECORD-PLAY solenoid L3001, FAST-FORWARD solenoid L3002, and REWIND solenoid L3003, A full understanding of dial and record circuit 154 from the standpoint of both structure and function may best be gained from tracing the various operating sequences.

The functional meaning of lead and apparatus designations used in this circuit are as follows:

| Lead designation: | Functional meaning |
|---|---|
| AC | Automatic cycle in progress. |
| BY | Busy. |
| COC | Change of office code pending. |
| DIP | Dialing in progress. |
| DP1, 2, 3 | Dial pulse output. |
| DS | Dead space. |
| DUB | Dubbing. |
| EOP1, 2 | End of program. |
| OC | Operated contactor. |
| OF– | Office number– –. |
| OS | Out of service. |
| PB | Playback. |
| RFD | Ready for dialing. |
| STC | Start an automatic cycle. |
| STD | Start dialing. |
| STP | Stop. |
| TRF | Trouble recorder full. |

Relay contacts are identified by the corresponding relay designation with subscript digits being indicative of the drawing sheet where the contact is located and also of the particular contact. Detached contact convention is employed throughout wherein an "X" represents a make contact and a "–" represents a break contact, the "make" and "break" conditions occurring upon the operation or energization of the corresponding relay.

*Recording an office code*

Figure 7:
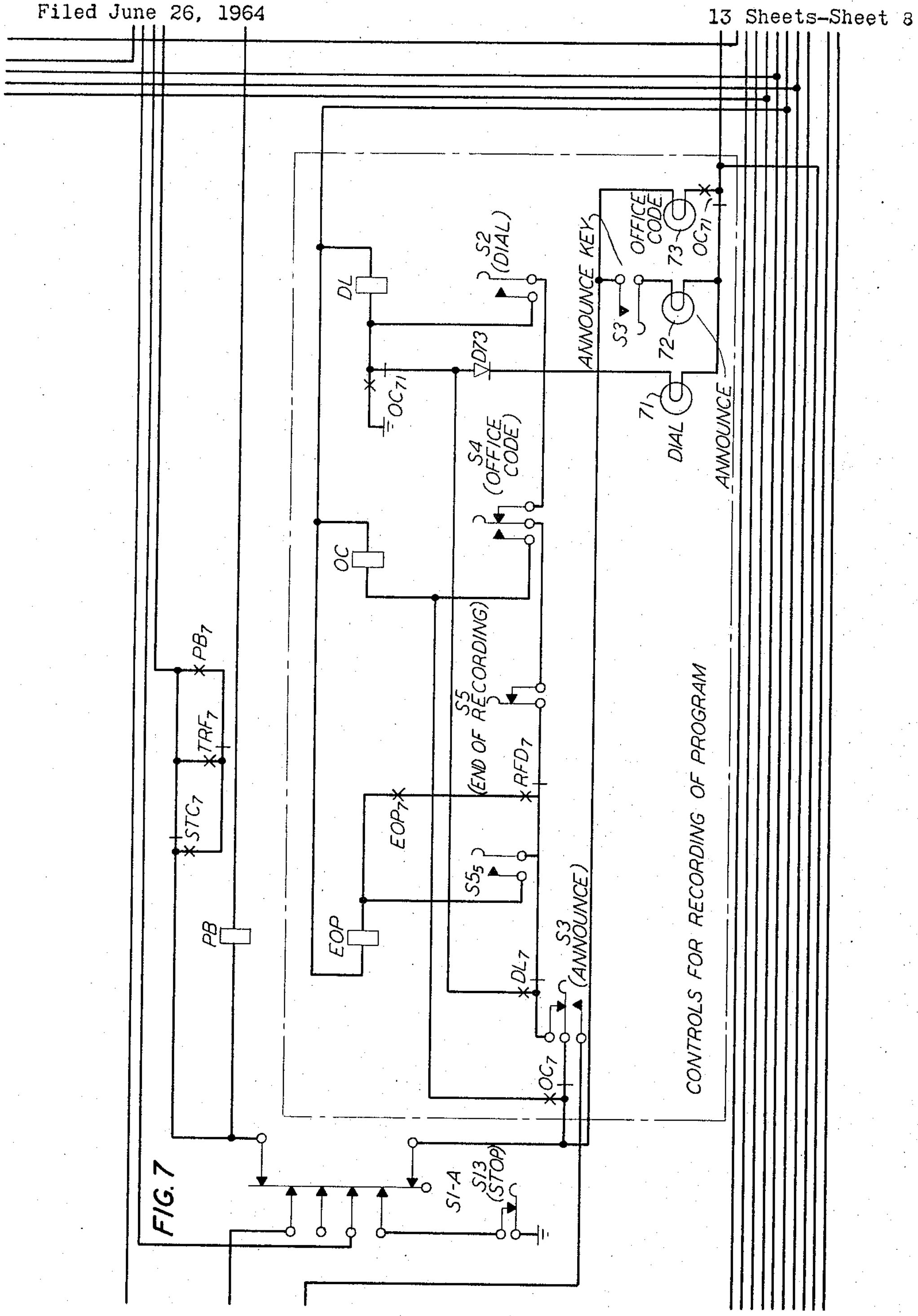
Figure 9:
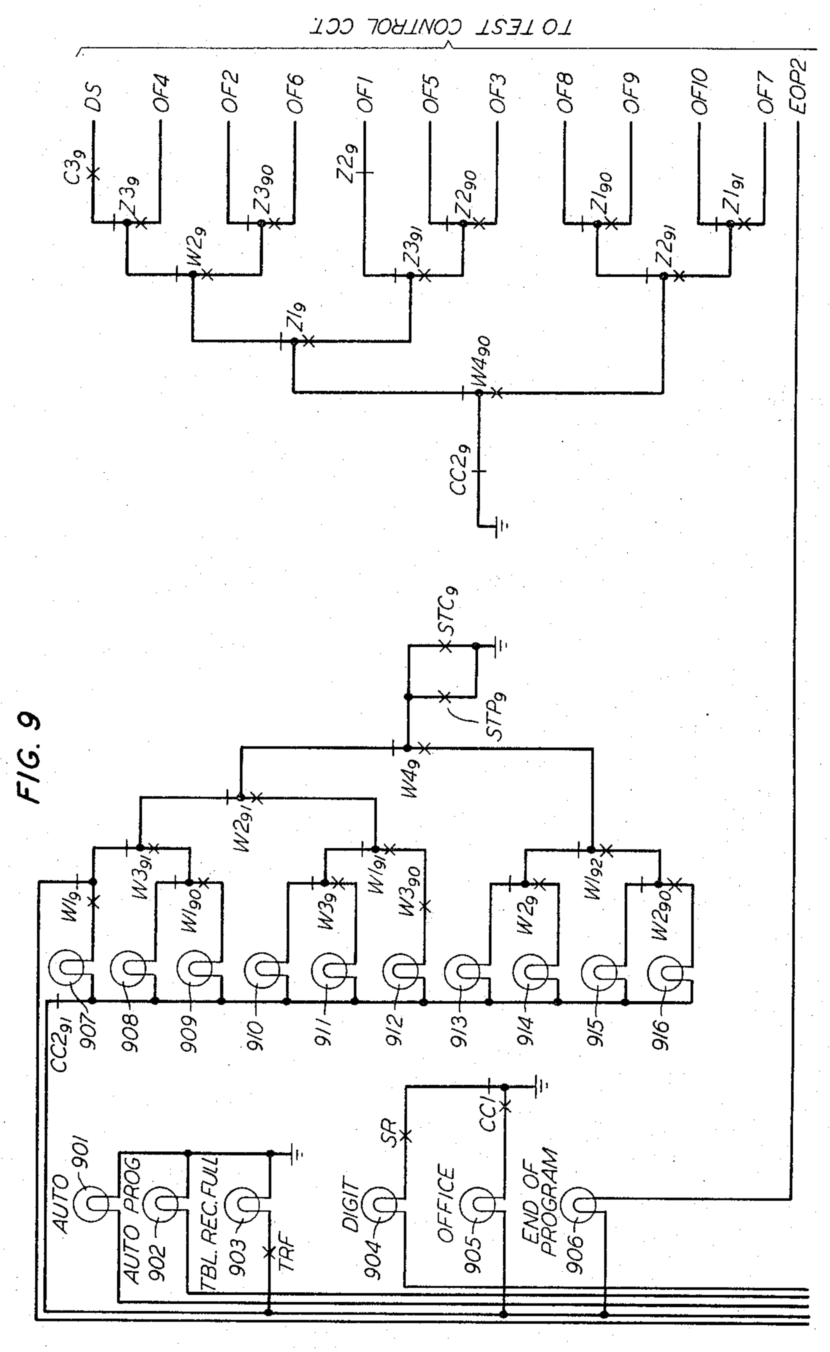

An OFFICE code key S4, shown in FIGS. 2A and 7, OFFICE code lamp 73, shown in FIG. 9, and the telephone dial DI, shown in FIG. 2A with dial contacts 505 in FIG. 5, provide means for initiating the recording of office codes. This is the first step in recording a test program. With switch S1 operated to position S1A, OFFICE code key S4 is depressed momentarily to operate relay OC, FIG. 7. Relay OC operated conditions the dial pulse tone output of tone oscillator OSC5 for control by the dial pulsing contact 505 through the operation of break contact $OC_5$. Oscillator OSC5 is of a conventional type employing a single transistor Q54 as its active element. Center-tapped inductor L51 and capacitor C54 provide a tank circuit in the emitter base loop of transistor Q54. Additional circuit elements employed in oscillator OSC5 include diode D54 and resistors R509, R510 and R511.

Relay DL is operated as ground is extended thereto by the operation of make contact $OC_7$. The operation of relay DL enables operation of BRAKE solenoid L3004 and RECORD-PLAY solenoid L3001 of program recorder PRR by the off-normal contacts ON of dial DI. This enabling is accomplished through the closing of make contact $DL_6$. The operation of transfer contacts $DL_5$ removes power source 81, FIG. 8, from speech record amplifier 301 and applies power to tone oscillator OSC5. The operation of transfer contacts $DL_{11}$ causes relay T, FIG. 11, to operate by connecting charged capacitor C11 across its winding. The operation of make contact $T_{10}$ extends ground to relay RFD, causing this relay to operate. Transfer contacts $RFD_5$ remove a shunt from the dial pulse tone output of tone oscillator OSC5. The closing of make contact $RFD_6$ extends a ground for the operation of BRAKE solenoid L3004 and RECORD-PLAY solenoid L3001 which permits program recorder PRR to run at PLAY speed.

An interval of approximately 0.75 second occurs following the operation of relay T, during which period a tone is recorded on dial and speech track DS and on control track CR of the program tape PT, as shown in FIG. 12. Relay T is held operated by the discharge current of capacitor C11. When the discharge current of capacitor C11 falls below the hold current requirement of the relay, relay T releases, ending the tone record interval. Relay T released opens make contact $T_{10}$, removing ground from relay RFD which also releases. The consequent opening of make contact $RFD_5$ removes the shunt from the dial pulse tone output of tone oscillator OSC5 through telephone dial pulsing contacts 505, thereby enabling pulsed tones to be generated by the dial pulsing contacts. The opening of make contact $RFD_6$ releases solenoids L3004 and L3001 to stop program recorder PRR. At this point program recorder PRR is conditioned to record the pulses of the office code digit in response to the operation of telephone dial DI.

When telephone dial DI is moved off-normal, operating off-normal make contact ON, FIG. 6, an operating path is provided for solenoids L3004 and L3001 which permits program recorder PRR to run at PLAY speed. During the entire time that dial DI is off-normal, tone is recorded on control track CR, as shown in FIG. 12. When dial DI is released, dial pulsing contacts 505 open and close for each pulse of the dialed digit as the dial returns to normal. With the telephone dial pulsing contact 505 open, a shunt is removed from the dial pulse tone output of tone oscillator OSC5, allowing tone to be recorded in bursts on dial and speech track DS, as shown in FIG. 12. With telephone dial pulsing contact 505 closed, a shunt is applied to dial pulse tone output of tone oscillator OSC5, interrupting recorded tone on dial and speech track DS. With telephone dial DS returned to normal, solenoids L3004 and L3001 are released by the opening of make contact ON, thus stopping program recorder PRR. At this point, program recorder PRR has the pulses of the office code digit recorded. FIG. 12 shows an illustrative office code digit 3 recorded on dial and speech track DS.

The office code function is terminated by operating STOP key S13, FIG. 7, which releases relay OC by removing ground therefrom. The release of relay OC and the consequent return to the unoperated condition of break contact $OC_5$ and transfer contacts $OC_7$ and $OC_{71}$, enables the operation of ANNOUNCE key S3, DIAL key S2, and END-OF-RECORDING key S5, all shown in FIG. 7; additionally, a shunt is connected across dial pulsing contact 505, thereby disabling generation of pulsed tones by dial DI, relay DL is released and OFFICE code lamp 73, FIG. 9, is extinguished.

Relay DL released and the consequent release of transfer contacts $DL_{110}$ disconnects capacitor C112 from charging voltage and connects it across relay T, FIG. 11, thus operating relay T. Relay RFD operates over the path to ground completed by make contact $T_{10}$. With relay RFD operated, a path, previously described, is provided to energize solenoids L3004 and L3001 to run program recorder PRR at PLAY speed.

An interval of approximately 0.50 second occurs following operation of relay T, during which no recording is applied to either track. This half-second interval is shown as a blank space on both tracks CR and DS in FIG. 12. Relay T is held operated by the discharge current of capacitor C112. When the discharge current falls below the hold current of the relay, relay T releases, releasing relay RFD. Relay RFD released, releases solenoid L3004 and solenoid L3001 to stop program recorder PRR.

*Recording test numbers*

Means providing for the recording of the digits of a test number include DIAL key S2, DIAL lamp 71 and telephone dial DI.

To record a test number, DIAL key S2 is depressed momentarily, completing a path to ground for the operation of relay DL. As previously described, the operation of relay DL enables the operation of solenoids L3004 and L3001 by off-normal contacts ON, applies power to tone oscillator OSC5, connects charged capacitor C112 across the winding of relay T, thereby operating relay T and further, the operation of transfer contacts $DL_7$ disables END-OF-RECORDING key S5 and OFFICE code key S4. In the manner described above, relay T operated, operates relay RFD which in turn operates solenoids L3004 and L3001 to run program recorder PRR at PLAY speed.

During an interval of approximately 0.75 second which occurs following the operation of relay T, tone is applied from oscillator OSC5 by way of a path which includes resistor R511 and capacitor C54 to RECORD-REPRODUCE head H3001B, thus recording tone on control tone track CR, as shown in FIG. 12. Relay T is held operated by the discharge current of capacitor C112. When the discharge current falls below the hold current of the relay, relay T releases, thus ending the tone-record interval and releasing relay RFD.

Relay RFD released releases solenoids L3004 and L3001 in the manner previously described, thereby stopping program recorder PRR. Additionally, the release of relay RFD lights DIAL lamp 71, and connects telephone dial pulsing contacts 505 in series with the shunt across the dial pulse tone output of tone oscillator OSC5, thereby enabling pulsed tones to be generated by dial pulsing contacts 505. At this point, program recorder PRR is now conditioned to record the pulses of each of the digits of the test number in response to the operation of telephone dial DL.

The operation of telephone dial off-normal make contact ON completes a path for the operation of solenoids L3004 and L3001 to run program recorder PRR at PLAY speed. During the entire time that dial DI is off-normal, tone is recorded on control track CR, as shown in FIG. 12. When the dial DI is released, dial pulsing contacts 505 open and close for each pulse of the dialed digit thereby recording tone pulses on dial and speech track DS as dial DI returns to normal. As previously indicated, upon each return to normal by telephone dial DI, solenoids L3004 and L3001 are released, which stops the program recorder PRR.

Program recorder PRR now has recorded the pulses of the first digit of the station to be called. In FIG. 12 an illustrative first digit 1 is shown. Succeeding digits, such as 2, 3, and 4, as shown in FIG. 12 are recorded in like manner in response to the operation of dial DI.

In some cases a two digit access code is employed in order to operate a test truck selector. In that event a total of six digits are required. The space button S14, FIG. 2A, is operated following the recording of the second digit of a six digit number which introduces a 0.75 second space. This space is provided to allow the connecting circuitry to recognize that the second digit has been completed and to allow for the stopping time and start-up time of the recorder. As indicated above, a four digit sequence rather than a six digit sequence is illustrated in FIG. 12.

*Terminating recording of test numbers using the ANNOUNCE key*

ANNOUNCE key S3, FIG. 7, is used for terminating the recording of test numbers and for conditioning program recorder PRR for the subsequent recording of the speech announcement. ANNOUNCE key S3 must be held operated for the duration of the speech-record interval. In the dial function, following the recording of all digits, the ANNOUNCE key S3, which controls both contacts S3 and $S3_7$, FIG. 7, is operated to solenoids L3001 and L3004 to run program recorder PRR at PLAY speed. Additionally, the operation of ANNOUNCE key S3 opens the operating path of relay DL, and disables DIAL key S2, OFFICE code key S4, and END-OF-RECORDING key S5 during the speech recording interval. Relay DL released extinguishes dial lamp 71 by opening its energizing path at make contact $DL_7$, disables the operation of solenoids L3001 and L3004 by off-normal contacts ON by opening make contact $DL_6$, and operates relay T by connecting charged capacitor C112 by the release of transfer contacts $DL_{110}$.

As previously described, relay T operated operates relay RFD and relay RFD operated removes power from speech-record amplifier 301 and operates solenoids L3001 and L3004 to run program recorder PRR at PLAY speed.

An interval of approximately 0.50 second occurs following operation of relay T during which no recording is done on either track. This condition is illustrated in FIG. 12 by the blank space on control track CR and on dial-and-speech track DS which follows the recording of the test station number.

Relay T is held operated during this period in the fashion previously described and when the discharge current of capacitor C112 falls below the hold current of the relay, relay T releases to release relay RFD. Relay RFD released causes ANNOUNCE lamp 72 to light over a path completed by unoperated break contact $RFD_7$ and applies power to speech-record amplifier 301 over unoperated break contact $RFD_3$. At this point, the recording of speech can be performed by the use of the operator's headset HS, shown in FIG. 3. Speech from headset HS is applied to speech amplifier 301 which employs transistors Q32 and Q31 as active elements. Speech is applied to the base of transistor Q32 by way of resistors R303 and R304 and capacitors C36 and C37. Resistors R301, R307, R302 and R308 establish biasing potentials for transistor Q32. The collector output of transistor Q32 is coupled to the base of transistor Q31 by capacitor C35. Resistors R33, R34, R35, R36, R37, R38, and R39 establish biasing potentials for transistor Q31. A feedback path for automatic volume control action is provided by way of diode D31 and varistors VR31 and VR32. The amplified speech output appearing on the collector of transistor Q31 is applied to RECORD-REPRODUCE head H2002 of program recorder PRR.

At the end of the speech recording interval, ANNOUNCE key S3 is released to extinguish ANNOUNCE lamp 72, to enable DIAL key S2, OFFICE code key S4 and END-OF-RECORDING key S5 and to release solenoids L3001 and L3004 to stop program recorder PRR.

*END-OF-RECORDING signal*

The end of an automatic test program recording is designated by recording an END-OF-RECORDING signal. END-OF-RECORDING key S5, which controls both contacts S5 and $S5_5$ shown in FIG. 5, is operated momentarily to operate relay EOP over an operating path that includes make contact $EOP_7$. Relay EOP operated operates relay T by connecting charged capacitors C11 and C110 across relay T over the path provided by the operation of transfer contacts $EOP_{11}$. As previously indicated, the operation of relay T operates relay RFD. The operation of transfer contacts $EOP_5$ removes power from the speech-record amplifier 301 and applies power to tone oscillator OSC5. Relay RFD operated lights the END-OF-RECORDING lamp 82 by completing a path to ground over make contact $EOP_8$, removes a shunt on the dial pulse tone output of tone oscillator OSC5 through the operation of break contact $EOP_5$, and disables DIAL key S2, and OFFICE code key S4 through the operation of break contact $RFD_7$ during the END-OF-RECORDING interval and, as described above, operates solenoids L3001 and L3004 to run program recorder PRR at PLAY speed.

Following the operation of relay T, for approximately 5 seconds, tones are recorded on the dial and speech track DS and on the control tone track CR, as shown in FIG. 12. Relay T is held operated by the discharge current of capacitors C11 and C110 until the discharge current of these capacitors is reduced below the hold current of the relay at which time relay T releases, releasing relay RFD. Relay RFD released extinguishes END-OF-RECORDING lamp 82 through the release of transfer contacts $RFD_8$, applies a shunt on the dial pulse tone output of tone oscillator OSC5 through the release of transfer contacts $RFD_5$, enables DIAL key S2, OFFICE code key S4, and END-OF-RECORDING key S5, through the release of transfer contacts $RFD_7$, releases relay EOP as the result of the release of transfer contacts $RFD_7$, and releases solenoids L3001 and L3004 by the release of make contact $RFD_6$ to stop program recorder PRR. The release of relay EOP removes power from tone oscillator OSC5 through the release of transfer contacts $EOP_5$.

The sequence of operations described immediately above terminates recording of the END-OF-RECORDING signal.

*Checking a recorded test program*

In order to ensure that a recorded test program does not contain errors, the principles of the invention provide means for individually checking each office code, test number and speech interval. The CHECK function is enabled by operating switch S1 to position S1–B, as shown in FIG. 4. Ground is thereby extended to relay M2 and relay M2 operates. Additionally, the following keys are enabled: ERASE key S8, FIG. 4, CHECK key S7, FIG. 6, which also operates contacts $S7_{12}$, FIG. 12, FORWARD key S10, FIG. 6, and REWIND key S9, FIG. 6. The operation of make contact $M2_6$ of relay M2 completes an operating path for the operation of program recorder drive motor M3001 by power supply 63.

The operation of CHECK key S7 completes an operating path for relay P, FIG. 6, and disables REWIND key S9 and FORWARD key S10.

With relay P operated, relay STP, FIG. 10, operates over an operating path which includes make contact $P_8$. Ground is extended to relay S by way of make contact $STP_3$ and relay S operates. Power from source 81 is extended to relay C2 over make contact $P_{81}$ and relay C2 operates. The operation of make contact $P_8$ completes a path which extends power from source 81 to each of the relays W1, Z1, W2, Z2, W3, Z3, W4 (all FIG. 10) to relay S and relay SR (FIG. 3), and to relays STP (FIG. 10), C2, C3, CC1, CC2, and STD (all FIG. 11).

Relay STD operates over a path to ground which is completed by make contact $S_{11}$. At this point CHECK key $S7_1$ (FIG. 12) is released, which completes a path to ground for the operation of relay SR. Relay SR operated opens break contacts $SR_{10}$ causing relay STP to release, closes make contact $SR_9$ lighting DIGIT lamp 904, and closes make contact $SR_{101}$ providing ground to and enabling the operation of counter relays W1, Z1, W2, Z2, W3, Z3 and W4, shown in FIG. 10. The release of relay STP closes break contact $STP_6$, completing an operating path to ground for solenoids L3001 and L3004, which causes program recorder PRR to run at PLAY speed.

With program recorder PRR running at PLAY speed in the check function, monitoring of the content of the dial and speech track DS of the program recorder PRR is provided at the receiver of the operator's headset HS, FIG. 3. The program tape PT may have any of the following signals recorded thereon: (1) speech, (2) digits of a trunk and line identification number, (3) a change office code digit or (4) an END-OF-RECORDING signal.

Program recorder PRR runs at PLAY speed throughout the recorded speech interval. The speech recorded on the dial and speech track DS of the program recorder PRR is amplified by amplifier 442 and is applied to the receiver of the operator's headset HS for monitoring by an operator.

*Test numbers recorded on program tape*

When digits of a test number are recorded on the program tape, a recorded tone appears on the upper or control track. This tone is amplified first by amplifier 442 and is then applied to amplifier-rectifier 444. Amplifier-rectifier 444 comprises a single transistor Q4, associated resistors R47, R48, R49, R401 and R402, capacitors C42, C43 and C44, diodes D41 and D42 and varistor VR4. The amplified-rectified output is applied by way of resistor R403 to the base of transistor Q53 and thence to the coil of relay C1, FIG. 5, and relay C1 operates. The operation of relay C1 opens the RFD and DIP leads through the operation of transfer contacts $C1_{10}$ and enables the operation of the DP1 and DP2 relays, FIG. 5, through the operation of transfer contacts $C1_5$.

A pulsing tone is extracted from the upper or control track CR by RECORD-REPRODUCE head H3001B, and from there is amplified by amplifier 441, the output of which is applied to the base of a coupling transistor Q5. Resistors R5 and R50 together with power supply 502 provide suitable biasing for transistor Q5. The output of transistor Q5 is applied to amplifier-rectifier 501 by way of coupling-capacitor C5. Amplifier-rectifier 501 includes a single transistor Q50 together with associated circuit components, Resistors R53, R54, R512, R55, R56 and R57, capacitors C50 and C51, varistors VR51 and VR52 and power supply 500.

The output of amplifier-rectifier 501 is applied to operate relay DP2 by way of transistor switch Q51 and is also applied to operate relay DP1 by way of transistor switch Q52. Relay DP1 may be a fast acting mercury wetted contact relay, for example, which operates to maintain the sixty percent break integrity of the dial pulses. Relay DP2 is not capable of maintaining pulse integrity and is used to provide pulses suitable only for operating local dial pulse counting and other relays.

Relay DP1 through the operation of break contact $DP1_{10}$ breaks the connection between the DP1 and DP2 leads to the test control circuit for the duration of each recorded dial pulse.

Relay DP2 operates on the first pulse of a digit and closes a path to ground through the operation of transfer contacts $DP2_{10}$ on the DP3 lead, operates relay C3 through the operation of transfer contacts $DP2_{11}$, allows relay S to release through the operation of transfer contacts $DP2_3$, FIG. 3, and operates relay W1 over make contact $DP2_{11}$. Relay C3 operated transfers the control of relay STD, FIG. 11, to the control of relay C1 through the operation of transfer contacts $C3_{111}$.

Relay S released transfers relay SR to the control of relay DP2 through the release of transfer contacts $S_3$. Capacitor C3 is charged during the operated pulse interval of relay DP2 and discharges through the winding of relay SR in the interval between pulses. If no pulses occur for approximately 100 milliseconds, relay SR releases.

Relay W1, FIG. 10, through the operation of transfer contacts $W1_{10}$ provides a shunt-down path against operation of relay Z1 for the duration of the operating pulse of relay DP2. Relays W1 and Z1 constitute a relay two-pulse counter.

At the end of the first recorded pulse, relays DP1 and DP2 are allowed to release. Relay DP2 released opens the DP3 lead through the release of transfer contacts $DP2_{10}$. The release of make contact $DP2_{11}$ opens a shunt-down path and allows relay Z1 to operate.

Upon each succeeding recorded pulse, relays DP1 and DP2 operate as described. Relay DP2, operated on the recorded tone pulses, provides additional pulses for use by the pulse-counting relay circuit.

After the last recorded pulse of a digit, capacitor C3 discharges through the winding of relay SR and when the discharge current falls below the hold current of the relay, relay SR releases to transfer control of the ground for operation of the counter relays to relay S through the release of make contacts $SR_{101}$ and $SR_{10}$. The DIGIT lamp 904 is extinguished by the release of make contact $SR_9$ and relay STP operates over a path which includes unoperated break contact $SR_{10}$.

Relay STP operated releases solenoids L3001 and L3004 by the operation of break contact $STP_6$, thereby stopping program recorder PRR, lights one of the numbered lamps 907 through 916 through the operation of make contact $STP_9$, and provides a path through the operation of make contact $STP_5$ to hold relay C1 operated without regard to the presence of a tone on the control tone track CR.

In the CHECK function described thus far, program recorder PRR has been played through the first recorded digit of the test number and has then been stopped. The digit has been counted by the relay counting circuit and is displayed by a numbered lamp. By operation of CHECK key S7, succeeding digits are played, counted and displayed, as described below.

CHECK key S7 is operated, which extends ground for the operation of relay S. Relay S operated causes the operated counter relays to release through the operation of break contact $S_{10}$ which removes ground from each of the counter relays. Relay S operated also enables operation of relay SR by release of CHECK key S7 by virtue of the operation of transfer contacts $S_3$. The release of the counter relays extinguishes the lighted number lamp through the operation of one of the sets of transfer contacts shown in FIG. 9. CHECK key S7 is released to operate relay SR. Relay SR operated provides a ground through make contact $SR_{101}$, enabling operation of the counter relays, lights DIGIT lamp 904 over make contact $SR_9$, and releases relay STP through the operation of break contact $SR_{10}$ which in turn applies ground through unoperated break contact $STP_6$ for the operation of solenoids L3001 and L3004 to run program recorder PRR at PLAY speed.

The presence of a recorded tone on control tone track CR holds relay C1 operated and indicates that additional digits or a space interval are recorded. Operation in the CHECK function with digits recorded on program tape PT continues.

Absence of a recorded tone on control tone track CR indicates that no additional digits are recorded and relay C1 is allowed to release. Relay C1 released allows relay STD to release by opening the operating path to ground at unoperated make contact $C1_{110}$, opens the DIP and RFD leads through the release of make contacts $C1_{10}$ and disables the operation of relays DP1 and DP2 through the release of transfer contacts $C1_5$.

Relay STD released provides a shunt-down path for the relase of relay C3, through the release of break contact $STD_{11}$ so that relay C3 may reoperate relay STD. The program recorder mechanism continues to run at PLAY speed.

*Office code digits recorded on program tape*

When an office code digit is recorded on program tape PT, recorded tones appear simultaneously on control track CR and on dial and speech track DS, as shown in FIG. 12. The signal on control tone track CR is amplified to operate relay C1 in the manner described above. The signal on dial and speech track DS is amplified to operate relays DP1 and DP2, also as described above. Relay C1 operated enables the operation of relays DP1 and DP2 through make contact $C1_5$, and opens the RFD lead and grounds the DIP lead through the operation of transfer contacts $C1_{10}$.

Relay DP2 operated operates relay C3, releases relay S, and grounds lead DP3 over contacts previously described. Relay C3 operated holds relay C2 operated, also over contacts previously described. When the hold current for relay C2 falls below a preselected level, which occurs in approximately 300 milliseconds, relay C2 releases. Relay S released transfers relay SR to the control of relay DP2.

Relay C2 released open leads DP3 by releasing make contact $C2_{102}$, opens lead DIP by the release of make contact $C2_{10}$ and operates relay CC1 by extending ground thereto over released break contact $C2_{11}$.

Relay CC1 operated extinguishes DIGIT lamp 904 and lights OFFICE lamp 905 as a result of the operation of transfer contacts $CC1_9$. Lead COC, FIG. 11, is grounded by the operation to make contacts $CC1_{112}$.

Following the apperance of recorded tone on the control tone and dial and speech tracks, an interval of approximately 0.75 second elapses at which point tone on dial and speech track DS is terminated, allowing relays DP1 and DP2 to release.

Relay DP2 released operates relay CC2 through the release of transfer contacts $DP2_{11}$, and allows charged capacitor C3, FIG. 3, to discharge through the winding of relay SR, holding relay SR operated. In approximately 100 milliseconds the discharge current falls below the hold current of the relay and relay SR releases.

Relay CC2 operated provides a ground by way of make contact $CC2_{10}$ for enabling the operation of the counter relays in response to the pulsing of relay DP2.

Following removal of the recorded tone on dial and speech track DS, an interval corresponding to the telephone dial wind-up time elapses and at that point a pulsing tone appears on dial and speech track DS of program recorder PRR. As previously described, the pulsing tone is amplified and operates relays DP1 and DP2 for the duration of each recorded pulse. Pulsing operation of relay DP2 results in operation of relay SR and of the counter relays.

Following the end of the last recorded pulse of the office code digit, the tone on control track CR is terminated, allowing relay C1 to release which, as previously described, releases relay STD, releases relay CC1 and disables operation of relays DP1 and DP2.

Relay STD released releases solenoids L3001 and L3004 which stops program recorder PRR and enables a shuntdown path for the release of relay C3, as previously described.

Relay CC1 released extinguishes OFFICE lamp 905, releases relay CC2, provides a path to hold the counter relays operated and opens lead COC by way of contacts described above. Relay CC2 released provides a path over break contact $CC2_9$ to apply ground to one of ten OF leads, the particular OF lead grounded being determined by the counter relay circuit. The releaese of relay CC2 also provides a path over break contact $CC2_{91}$ to supply power for lighting one of the numbered lamps 907 through 916, the particular lamp that is lighted being determined by the counter relay circuit.

During an interval of approximately 100 milliseconds following the end of the last recorded pulse of an office code digit, capacitor C3 discharges through the winding of relay SR. When the discharge current falls below the hold current of the relay, relay SR releases to operate relay STP and to transfer control of the operated counter relays to relay S by way of contacts previously described. Relay STP operated provides a ground by way of make contact $STP_9$, allowing a numbered lamp to light.

As described immediately above, program recorder PRR has been played through an office code digit and has stopped. The digit has been counted by the relay counter circuit and is displayed by a number lamp. The absence of a recorded tone on control tone track CR indicates that no digits are to follow and program recorder PRR continues running at PLAY speed in the CHECK function.

*Operation of the counter relays in counting pulses of recorded office code or test number*

In the CHECK function, counting relays W1, Z1, W2, Z2, W3, Z3, and W4 operate in a two-pulse decade counter circuit, responding to the pulses resulting from the operation of relay DP2, counting each pulse of a recorded office code or test number and registering and displaying each digit individually. When operating automatically in the AUTO function, the counter relays respond only to pulses of the office code digit. The digit is registered and displayed as in the CHECK function and, in addition, the counter relays provide a relay memory for the office number and provide an output on one of ten corresponding OF leads for the duration of test number out-pulsing within the orifice code group. To facilitate the dual usage of the counter circuit, two grounds are supplied, as shown in FIG. 10. One ground, in series with make pulsing contacts $DP2_{11}$ constitutes an operating path. A second path to ground constitutes a hold ground and is enabled for the duration of the counting operation and in the interval during which the counter circuit acts as a memory.

With both the operate and hold grounds enabled, and relay DP2 operated on the first pulse, relay W1 operates to shut down relay Z1. Relay DP2 released at the end of the first pulse allows relay Z1 to operate. Relay Z1 operated enables operation of relay W2.

Relay DP2 operated on the second pulse operates relays W2 and shunts down relay W1 and relay W1 releases. Relay W2 operated shunts down relay Z2. Relay DP2 released at the end of the second pulse, allows relay Z2 to operate and releases relay Z1. Relay Z2 operated and relay Z1 released enables operation of relay W3. A change of state of relay W2 and Z2 is disabled in the interval relay Z1 is released.

On successive pulses, similar action to that described above accurs. Thus, for example, on the tenth pulse relay DP2 operated operates relay W2, shunts down relay W1 and relay W1 releases. Relay W2 operated shunts down relay Z2. Relay DP2 released at the end of the tenth pulse allows relay Z2 to operate and releases relay Z1.

At the end of each pulse of relay DP2, the counter relays each stable states and the contact trees shown in FIG. 9 provide read out on a one-out-of-ten basis. Thus, with the operate path opened, the counter relays constitute a relay memory so long as the holding ground is maintained. By opening the holding ground path, the relay memory is destroyed and the operated counter relays release. The following table lists the counter relays operated after each pulse of a recorded digit:

| Following Pulse No. | Condition of Relay | | | | | | |
|---|---|---|---|---|---|---|---|
| | W1 | Z1 | W2 | Z2 | W3 | Z3 | W4 |
| 1 | O | O | R | R | R | R | R |
| 2 | R | R | O | O | R | R | R |
| 3 | O | O | O | O | O | O | R |
| 4 | R | R | R | R | O | O | R |
| 5 | O | O | R | R | O | O | R |
| 6 | R | R | O | O | O | O | R |
| 7 | O | O | O | O | R | R | O |
| 8 | R | R | R | R | R | R | O |
| 9 | O | O | R | R | R | R | O |
| 10 | R | R | O | O | R | R | O |

O—Relay Operated.
R—Relay Released.

*END-OF-RECORDING recorded on program tape*

When an END-OF-RECORDING signal is recorded on the program tape, as shown in FIG. 12, recorded tones appear simultaneously on control tone track CR and on dial and speech track DS. The signal on control tone track CR is amplified as before to operate relay C1. The signal on dial and speech track DS is also amplified as previously described to enable operation of relays DP1 and DP2 following operation of relay C1.

Relay DP2 operated operates relay C3, releases relay S and grounds lead DP3 over contacts previously described. Relay C3 operated holds relay C2 operated, as previously described. When the discharge current from capacitor C111 falls below the hold current of the relay, which occurs in aproximately 300 milliseconds, relay C2 releases. Relay S released transfers control of relay SR to relay DP2.

Relay C2 released opens lead DIP, opens lead DP3, operates relay CC1 and closes a connection between leads DP1 and DP2 by way of contacts previously described.

Relay CC1 operated extinguishes DIGIT lamp 904, opens the holding path for the counter relay circuit and grounds lead COC by way of contacts previously described.

For an interval of approximately 5 seconds, as shown in FIG. 12, a continuous recorded tone appears on control track CR and on dial and speech track DS. The tones on both tracks terminate simultaneously, allowing relays C1, DP1 and DP2 to release.

Relay C1 released releases relay STD which in turn, as described above, releases solenoids L3001 and L3004 to stop program recorder PRR. Relay C1 released also releases relay CC1 and relays DP1 and DP2.

Relay CC1 released extinguishes office lamp 905, enables operation of relay STP, and opens lead COC by way of contacts previously described.

Relay DP2 released enables the operation of relay STP and, as described above, holds relay SR operated for a period of approximately 100 milliseconds. Relay SR released operates relay STP. Relay STP operated enables operation of relay S by CHECK key S7.

As described immediately above, program recorder PRR has been played through the END-OF-RECORDING interval and has stopped. Succeeding program material may be checked by operation of CHECK key S7 in the manner described. Normal operation at this point consists of rewinding program tape TP by use of REWIND key S9.

*ERASE key*

Figure 8:
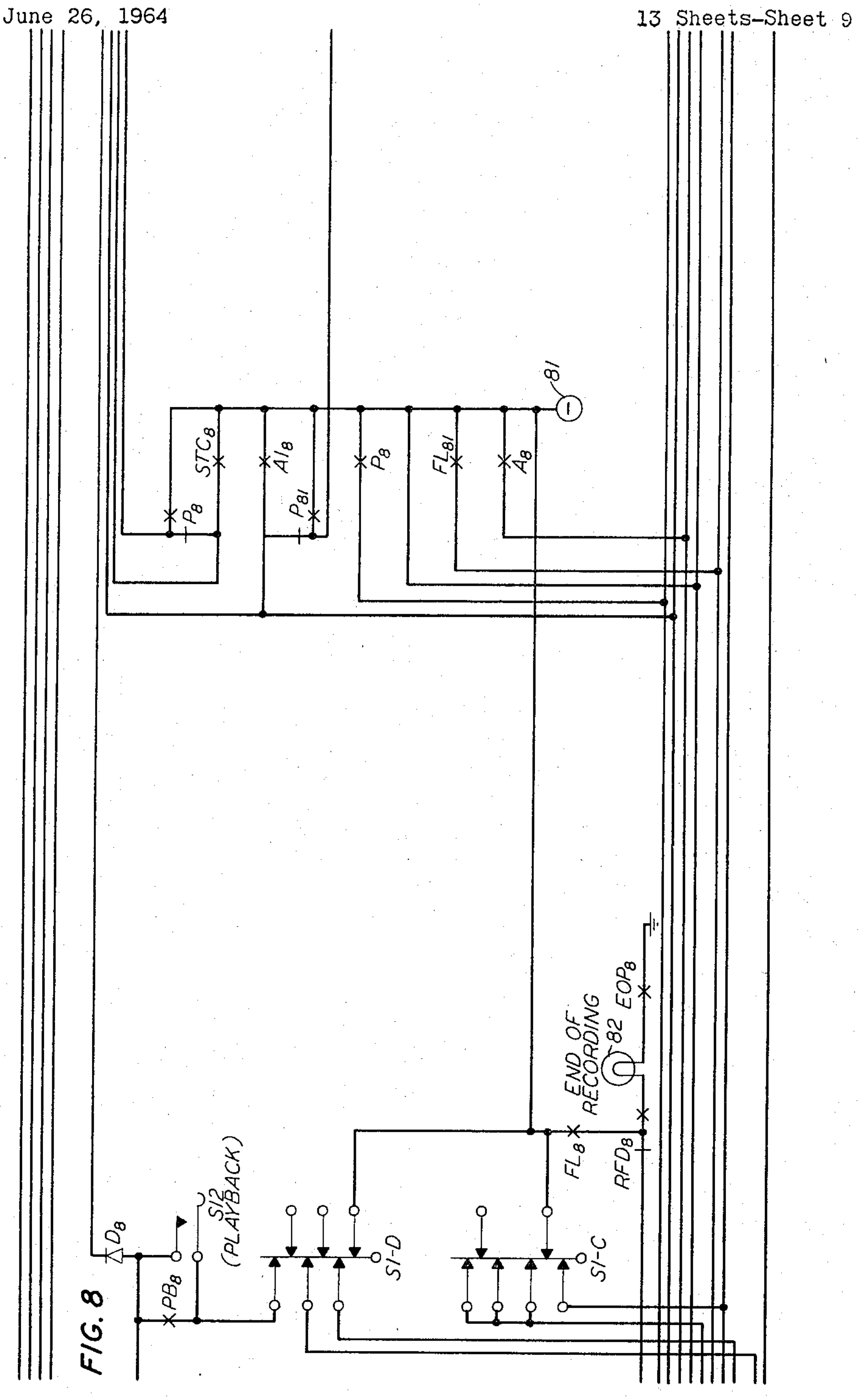

ERASE key S8 completes a path for the application of ERASE current from power supply 81, FIG. 8, to a separate selective ERASE head H3003, located so that the program may be erased simultaneously with PLAYBACK, REWIND, or FORWARD operation in position B of switch S1. When operating at PLAY speed, the program tape passes over RECORD-REPRODUCE head H3001B and then over selective ERASE head H3003. Using the operator's head telephone set HS, the operator may monitor and simultaneously erase selected parts of the program by operation of ERASE key S8.

*FAST-FORWARD key*

The program tape may be advanced forward at high speeds by operation of FAST-FORWARD key S10, FIG. 6. FAST-FORWARD key S10 is disabled by operation of CHECK key S7 and remains disabled following operation of CHECK key S7 until STOP key S13 is operated to release relay P. Relay P released enables FAST-FORWARD key S10. FAST-FORWARD key S10 operated extends ground for the operation of solenoids L3002 and L3004 to cause program recorder PRR to advance the tape forward at high speed.

A mechanical forward limit switch, shown schematically as break contact 61, is provided to prevent running beyond the end of program tape PT when operating at PLAY or FAST-FORWARD speeds. Break contact 61 operated removes ground from relay FL and relay FL releases. Relay FL released releases solenoids L3002 and L3004 through the opening of make contacts $FL_6$ and $FL_{61}$, thereby stopping program recorder PRR and disabling FAST-FORWARD key S10. The opening of make contact $FL_{81}$ removes power source 81 from relays EOP, OC, BL and T, all of which are used in recording a test program, thereby alerting the operator that the end of program tape PT has been reached. The opening of make contact $FL_8$ removes power supply 81 from relay A, causing relay A to release, thereby terminating an automatic cycle in progress.

With relay FL released, operation of program recorder PRR may be restored only by operation of REWIND key S9.

*REWIND key*

Program tape PT may be rewound at high speed by operation of REWIND key S9. REWIND key S9, which is disabled by holding FAST-FORWARD key S10 operated or by operation of CHECK key S7, remains disabled following operation of CHECK key S7 until STOP key S13 is operated to release relay P. Relay P released enables REWIND key S9 through the release of transfer contacts $P_6$. REWIND key S9 operated operates solenoids L3003 and L3004 to rewind tape PT at high speed.

A mechanical REWIND limit switch, shown schematically in FIG. 6, as break contact L, is provided to prevent rewinding beyond the end of program tape PT. Break contact L operated releases solenoids L3003 and L3004 to stop program recorder PRR. With the REWIND limit switch operated, further operation of program recorder PRR is enabled only in functions such as PLAYBACK and FAST-FORWARD which cause the tape to move in the FORWARD direction.

*Automatic operation in the test program*

To initiate or enable an automatic test cycle, switch S1 is placed in position B, as shown in FIG. 4, and AUTO key S11 is operated to extend ground for the operation of relay A. Relay A operated extends ground to lead AC, FIG. 11, over make contact $A_{11}$, enables the operation of relays STC and RW over make contact $A_8$, and lights AUTO lamp 901.

When lead STC is grounded, relay T operates to operate relay STC over make contact $T_{110}$, and to enable operation of solenoid L2001 by way of make contact $ST_6$. The operation of relay STC enables one of the numbered lamps 907 through 916 to be operated over make contact $STC_9$, and enables operation of relays W1, Z1, W2, Z2, W3, Z3, W4, STP, CC1, CC2, C2, C3, and STD and lights the AUTO PROG lamp 902 by way of make contact $STC_8$. Relay A1, FIG. 2, operates over make contact $STC_{12}$. Relay A1 operated operates RECORD solenoid L2001 by way of make contact $A1_8$, operates relay ST over make contact $A1_{10}$ and enables operation of relays DUB–1, DUB–2 and TRF over make contact $A1_8$. Relay A1 operated also provides ERASE current for ERASE head H2001 and bias current for RECORD-REPRODUCE head H2002, and further, operates relay M2 over the obvious path to run motor M2001.

Relay C2 operated removes a shunt by the operation of transfer contacts $C2_{51}$ and inserts resistor R507 into the output circuit of tone oscillator OSC5 for controlling the level of the dial pulse tone output. Relay C2 operated enables lead DIP and grounds lead RFD by way of transfer contacts $Cl_{10}$. Lead DP3 is enabled by the operation of make contact $C2_{102}$.

RECORD solenoid L2001 operated releases a timer drum from the timer gear (not shown) on trouble recorder TR. A tab (not shown) on the timer drum rests against a FORWARD-LIMIT switch, shown schematically as break contact LF, FIG. 2, without operating the switch and remains there as long as solenoid L2001 is operated.

In the condition described immediately above, trouble recorder TR is prepared to record trouble indications. Automatic dialing of the prerecorded program is initiated when lead STD is grounded to operate relay STD.

Relay STD operated operates solenoids L3001 and L3004 over contacts previously described to run program recorder PR at PLAY speed and also locks up on break contact $C3_{112}$, thus allowing the ground supplied on the STD lead to be removed.

The proper sequence of a recorded program is as follows. (a) an office code digit; (b) the digits of a test number; (c) a speech recording identifying number; (d) additional numbers within the established office code group, each followed by its associated speech recording; (e) a dead space following the last number within the established office code group; (f) a new office code digit, followed by numbers and speech, and a dead space at the end of each office group, as before; (g) following the last number and speech of the last office code in the program, an END-OF-RECORDING signal.

A single recording sequence, as described above, is illustrated in FIG. 12.

In the following discussions of the AUTOMATIC mode of operation, many of the relay operating sequences are identical to those described above for the TEST function. Accordingly, in those instances, circuit descriptions do not include detailed listings of those interrelations of the various relay contacts which have previously been noted. A full description of relay operating sequences is included, however, whenever such sequences have not previously been described.

*Office code digit recorded on program tape*

When an office code digit is recorded on the program tape, recorded tones appear simultaneously on control tone track CR and on dial and speech track DS. The signal on control tone track CR is amplified to operate relay C1. The signal on dial and speech track DS is amplified to operate relays DP1 and DP2.

Relay C1 operated enables operation of relays DP1 and DP2 and opens the RFD lead and grounds the DIP lead.

Relay DP1 operated opens the connection between the DP1 and DP2 leads. Relay DP2 operated operates relay C3.

Relay C3 operated provides a hold path for relay STD through the counter relay tree such that, if no office code is established, relay STD is held operated, thus causing program recorder PRR to run at PLAY speed until an office code is established. Relay C3 operated also allows the discharge current of capacitor C111 to flow through the winding of relay C2, holding this relay operated. When the discharge current of capacitor C111 falls below the hold current of the relay, relay C2 releases.

Relay C2 released operates relay CC1, opens the DP3 and DIP leads and closes the connection between the DP1 and DP2 leads.

Relay CC1 operated grounds the COC lead, opens the hold path for relay T, allowing the discharge current of capacitors C111 and C110 to hold relay T operated, lights office lamp 905, and opens the hold path for counter relays W1, W2, W3, W4, Z1, Z2, and Z3, allowing any operated counter relays to release.

The recorded tone on dial and speech track DS is terminated approximately 0.75 second after the beginning of the change office code interval, allowing relays DP1 and DP2 to release. Relay DP2 released operates relay CC2. Relay CC2 operated provides an operate and hold path for the counter relays over make contact $CC2_{101}$ and make contact $CC2_{10}$, and establishes a hold path for relay T over make contact $CC2_{111}$, recharging capacitors C111 and C110.

A pulsing tone, corresponding to the pulses of the recorded office tone digit, appears on dial and speech track DS after the recorded telephone dial wind-up time, to operate relays DP1 and DP2.

Relay DP2 operated on the first pulse of the digit, operates relay W1. Relay W1 operated provides a shunt-down path through make contact $DP2_{11}$, preventing relay Z1 from operating.

At the end of the first recorded pulse, relays DP1 and DP2 are allowed to release. Relay DP2 released opens a shunt-down path and allows relay Z1 to operate.

Relays DP1 and DP2 operate at the beginning and release at the end of all succeeding recording pulses which make up the office code digit. The pulsing operation of relay DP2 provides additional pulses for use by the pulse counting relay circuit.

The recorded tone on control track CR is terminated following the end of the last recorded pulse of the office digit code, releasing relay C1 which in turn releases relays STD and CC1 and disables operation of relays DP1 and DP2.

Relay STD released releases solenoids L3001 and L3004 to stop program recorder PRR.

Relay CC1 released releases relay C3, extinguishes OFFICE lamp 905, opens lead COC and establishes a holding path for the operated counter relays.

Relay C3 released releases relay CC2 and operates relay C2, Relay CC2 released opens a holding path for the operated counter relays in parallel with that provided by relay CC1 and opens the operate path for the counter relays so that further pulsing of relay DP2 will not change the status of the memory. Relay CC2 released also grounds one of ten of the OF leads and lights one of ten of the lamps 907 through 916.

At this point an office code has been established. Corresponding to the number of the established office code, contact trees of the counter relays determine which one of the ten OF leads is grounded and which one of the ten numbered lamps is lighted.

Relay C2 operated grounds lead RFD, and removes a shunt between the DP1 and DP2 leads, thereby enabling relay DP1 to open the connection between the DP1 and DP2 leads during subsequent outpulsing of the test numbers.

No further action occurs until ground is supplied on lead STD to operate relay STD which in turn operates solenoids L3001 and L3004 to run program recorder PRR at PLAY speed and provides a holding path for relay STD, thus allowing removal of ground on the STD lead.

*Outpulsing of a test number*

A recorded tone appears on control track CR when digits of a test number are recorded on program tape PT. The signal is amplified as before to operate relay C1 which grounds lead DIP, opens lead RFD and enables relays DP1 and DP2.

Following appearance of tone on control track CR an interval of approximately 0.75 second plus the recorded telephone dial wind-up time elapses and at that point a pulsing tone produced in recording by the pulsing contacts 505 of telephone dial DI appears on dial and speech track DS of program recorder PRR. The pulsing signal is amplified to operate relays DP1 and DP2, as previously described. Relay DP2 operated on the first pulse of the digit grounds the DP3 lead and operates relay C3.

At the end of the first recorded pulse, relays DP1 and DP2 released. Relay DP1 released closes the connection between the DP1 and DP2 leads. Relay DP2 released opens lead DP3. Relays DP1 and DP2 operate for the duration of all succeeding recorded dial pulses.

As previously indicated, a six digit number rather than a four digit number is recorded in some instances. The second digit of a six digit number provides pulses for stepping a test trunk selector (not shown—a part of test trunk circuit 156 of FIG. 1) to the desired vertical level. Following the last pulse of the second digit of a six digit number, a 0.75 second duration SPACE interval is recorded on program tape PT to allow time for stopping, restarting and accelerating program recorder PRR to PLAY speed. Program recorder PRR is stopped only long enough for the test trunk selector to find a vacant horizontal position. A STOP interval is initiated by a ground on lead STP to operate relay STP which in turn releases solenoids L3001 and L3004 to stop program recorder PRR, holds relay C1 operated and discharges capacitor C53.

The STOP interval is terminated when ground on lead STP is removed, which serves to operate solenoids L3001 and L3004 to run program recorder PRR at PLAY speed. This action also allows capacitor C53 to recharge through the winding of relay C1, holding relay C1 operated.

The charge current of capacitor C53 holds relay C1 operated during the AUTOMATIC cycle long enough following release of relay STP for program recorder PRR to accelerate to and run at PLAY speed until the amplifier control tone again establishes operating control of relay C1.

Program recorder PRR continues at PLAY speed through the remaining digits of the test number. Relays DP1 and DP2 operate for the duration of all succeeding dial pulses, generating output pulses as previously described. Following the last pulse of the last digit of the number, the recorded tone on control track CR ends, allowing relay C1 to release.

In order to establish a normal release time for relay C1 at the end of the recorded control tone, a diode gate D54 and a resistor R503 cause capacitor C53 to charge to the full supply voltage. With the control tone terminated, the operate path for relay C1 is opened. With capacitor C53 fully charged, diode gate D54 is reverse-biased and no current can flow through capacitor C53 and the winding of relay C1 and as a result relay C1 releases in the normal release time.

Relay C1 released grounds the RFD lead and opens the DIP lead, disables operations of relays DP1 and DP2 and releases relay STD, providing that an office code is registered in the relay memory circuit. Relay STD released releases solenoids L3001 and L3004 to stop program rcorder PRR. No further action in the test program can occur until one of the leads STD, OC or BY is grounded.

On program tape PT a speech announcement is recorded following each test number, as shown in FIG. 12. In the AUTOMATIC cycle, this speech recording is handled in one of three different ways, depending upon the results of the tests. The OC lead, FIG. 10 is grounded if an operated contactor, such as contactor CO1, CO2 or CO3 shown in FIG. 1, exists on the line under test, the BY lead if the line under test is busy and therefore cannot be tested, or the STD lead to start dialing the next number if the contactor tested satisfactorily. Ground on lead STD shunts relay C3 over make contact $C3_{111}$ to release relay C3 which in turn causes relay STD to operate over normally closed break contact $C3_{111}$.

Relay STD operated operates solenoids L3001 and L3004 to run program recorder PRR at PLAY speed through the recorder speech interval and to proceed into the next recorded OFFICE CODE, DIGITS, or END-OF-RECORDING interval.

*Operated contactor on line under test*

If an operated contactor exists on a line under test, lead OC is grounded to complete an operating path for relay DUB1. Relay DUB1 operated causes solenoid L2002 to operate over make contact $DUB1_2$, thereby running trouble recorder TRR at PLAY speed, grounds the DUB lead and opens the RFD lead, operates solenoids L3001 and L3004 over make contact $DUB1_6$ to run program recorder PRR at PLAY speed and operates relay M1, thereby closing make contact $M1_6$ to complete an operating path for trouble recorder motor M2001.

The speech announcement recorded on the dial and speech track DS of the program tape is detected by RECORD-REPRODUCE head H3001B, is amplified by amplifier 441, and is applied to the trouble recorder RECORD-REPRODUCE head H2002 by way of a path which includes capacitor C49 and resistor R45. Thus, the speech announcement is dubbed from the program tape to the trouble tape.

The end of the recorded speech announcement interval is evidenced by the appearance of a recorded tone on the control tone track CR of program recorder PRR. When the tone appears on control track CR it is amplified to operate relay C1 as previously described. Relay C1 operated releases relay DUB1 by removing ground therefrom through the operation of transfer contact $C1_5$.

Relay DUB1 released releases solenoid L2002 to stop trouble recorder TRR, opens the DUB lead and grounds the DIP lead, releases solenoids L3001 and L3004 to stop program recorder PRR and releases relay M1 to remove power from trouble recorder motor M2001.

With program tape PT stopped, the signal on control tone track CR can no longer be detected and amplified to hold relay C1 operated, so relay C1 releases. Relay C1 released opens the DIP lead and grounds the RFD lead.

A speech announcement of the test number, indicating that the operated contactor has been located, has now been recorded on the trouble tape. No further operation in the AUTOMATIC cycle occurs until ground is provided on the STD lead to shunt relay C3, causing relay C3 to release to transfer the ground on the STD lead from the shunt path of relay C3 to the operate path of relay STD, operating relay STD.

Relay STD operated operates solenoids L3001 and L3004, as previously described, to run program recorder PRR at PLAY speed into the next recorded OFFICE, DIGITS or END-OF-RECORDING interval.

*Line under test BUSY*

If the line to be tested is BUSY and therfore cannot be tested, ground is provided on the BY lead, FIG, 10, to operate relay DUB2. Relay DUB2 operated operates solenoid L2002 over make contact $DUB2_2$ to run trouble recorder TRR at PLAY speed, grounds lead DUB and opens lead RFD by the operation of transfer contacts $DUB_{10}$, and operates solenoids L3001 and L3004 over make contact $DUB2_6$ to permit program recorder PRR to run at PLAY speed, and operates relay M1 to energize trouble recorder motor M2001 over make contact $M1_6$.

The speech announcement is again dubbed onto trouble tape TT. At the end of the speech interval, relay C1 operates, operating transfer contacts $C1_5$, thereby removing a short across capacitor C101, allowing the charge current of capacitor C101 to flow through the winding of relay DUB2, thus holding relay DUB2 operated. Relay C1 operated also energizes tone oscillator OCS5 over make contact $C1_{50}$.

The dial pulse tone output of tone oscillator OSC5 is fed to RECORD-REPRODUCE head H2002 of trouble recorder TRR, recording tone thereon. Approximately 0.50 second after the operation of relay C1 the charge current of capacitor C101 falls below the hold current of relay DUB2 and DUB2 releases.

The release of relay DUB2 releases solenoid L2002 to stop trouble recorder TRR, opens the DUB lead and grounds the DIP lead, releases solenoids L3001 and L3004 to stop program recorder PRR, removes power to tone oscillator OSC5 and releases relay M1 to remove power from trouble recorder motor M2001.

With program tape PT stopped, the signal on control tone track CR can no longer be detected and amplified to hold relay C1 operated and relay C1 releases. Relay C1, released, opens lead DIP and grounds lead RFD.

A speech announcement of the test number and a burst of tone has now been recorded on trouble tape TT, as shown in FIG. 12, to indicate that no test was made because the line was busy at the time a test was attempted. No further operation in the AUTOMATIC cycle occurs until lead STD is grounded to shunt relay C3, causing relay C3 to release. Relay C3 released operates relay STD. Relay STD operated operates solenoids L3001 and L3004 to run recorder PRR at PLAY speed into the next recorded OFFICE, DIGITS, or END-OF-RECORDING interval.

*END-OF-RECORDING recorded on program tape*

When an END-OF-RECORDING signal is recorded on program tape PT, recorded tones appear simultaneously on control track CR and on dial and speech track DS. The signal on control tone track CR is amplified to operate relay C1, as previously described. The signal on dial and speech track DS is amplified to operate relays DP1 and DP2, also as described above.

Relay C1 operated enables the operation of relays DP1 and DP2 and opens the RFD lead and grounds the DIP lead. Relay DP1 operated opens the connection between the DP1 and DP2 leads. Relay DP2 operated operates relay C3 and relay C3 operated causes relay C2 to release.

Relay C2 released operates relay CC1, opens the DP3 and DIP leads and closes the connections between the DP1 and DP2 leads. Relay CC1 operated grounds lead COC, opens the hold path for relay T, lights OFFICE lamp 905 and releases the operated counter relays. Upon release of relay T, the DIAL AND RECORD circuit is no longer in an AUTOMATIC test cycle.

The operating sequences described in the following paragraphs serve merely to restore the circuit to a state in which a new AUTOMATIC test cycle may properly be initiated. Relay T released releases solenoid L2001 to lock a timer drum (not shown) to a timer gear (not shown) of trouble recorder TRR and also operates relay RW. Relay RW operated grounds lead EOP1 over make contact $RW_{110}$, releases relay STC by removing ground at break contact $RW_{111}$, releases relays C1, DP1, and DP2 through the removal of ground by break contact $RW_5$, provides a path holding relay RW operated through REWIND limit switch L of program recorder PRR and operates solenoids L3003 and L3004 by way of make contact $RW_6$ to rewind program recorder PRR.

Relay STC released releases relay CC1, C3 and STD and extinguishes AUTO PROGRAM lamp 902 by the opening of make contact $STC_8$. Relay A1 is released through the release of make contact $STC_{12}$.

Relay CC1 released extinguishes OFFICE lamp 905 by the release of transfer contact $CC1_9$ and opens lead COC by the release of make contact $CC1_{112}$.

Relay A1 released releases relay ST through the release of transfer contacts $A1_{10}$ and removes power from ERASE head H2001 and bias current from RECORD-REPRODUCE head H2002 of trouble recorder TRR by the release of make contact $A1_8$.

Relay ST released operates solenoid L2003 through the release of make contact $ST_{15}$, opens an operate path for relay ST by the release of transfer contacts $ST_9$ so that relay ST may not be reoperated prior to operation of REWIND LIMIT switch LR and operates relay M1 to energize trouble recorder motor M2001.

Solenoid L2003 operated causes the tape supply spool (not shown) of trouble recorder TRR to drive in a backward direction which rewinds trouble tape TT.

As the rewinding trouble recorder TRR nears the end of the tape, the REWIND limit switch, shown as break contact L on FIG. 6, is operated by a timer gear (not shown), releasing relay M1 and REWIND solenoid L2003. Relay M1 released removes power from trouble recorder motor M2001. REWIND solenoid L3003 released allows the tape to stop.

At this point trouble recorder TRR is rewound to the beginning of trouble tape TT with a recording on the tape.

As the end of the rewinding program tape is reached REWIND limit switch L operates, releasing solenoids L3003 and L3004 to stop program recorder PRR and relay RW releases.

Relay RW released releases relay M2, and opens lead EOP1, FIG. 11. Relay M2 released removes power from program recorder motor M3001. Program recorder PRR is now rewound to the beginning of program tape PT and stopped. A new test cycle may be initiated by a ground on lead STC.

*PLAYBACK of the trouble recording*

PLAYBACK of the trouble recording may be initiated remotely when switch S1 is in position C, providing an AUTOMATIC test cycle is not in progress and either remotely or by use of PLAYBACK key S12, when switch S1 is in position D.

Operation of relay PB is a prerequisite to PLAYBACK of trouble recorder TRR and may occur in any one of the following three ways: (a) with switch S1 in position C, as shown in FIG. 8, and an AUTOMATIC test program not in progress, relay PB may operate on a ground applied to lead PB, FIG. 11; (b) with switch S1 in position D, relay STC is not operated, and accordingly relay PB, once again, may operate on a ground supplied on lead PB; (c) with switch S1 in position D, operation of PLAYBACK key S12 completes a path to ground for the operation of relay PB.

Trouble recorder TRR is normally in the REWOUND condition when PLAYBACK is initiated in one of the three above-mentioned ways, so that the speech announcement of trouble begins immediately following operation of relay PB. Relay PB operated operates relay ST over make contact $PB_3$, and operates relay R over make contact $PB_4$. Relay R operated connects RECORD-REPRODUCE head H2002 of trouble recorder TRR to the input of amplifier 441.

Relay ST operated disables operation of solenoid L2003, by the operation of transfer contacts $ST_{15}$, operates relay M1 as a result of the operation of transfer contacts $SD_{15}$, and operates solenoid L2002 by the operation of transfer contacts $ST_9$.

Relay M1 operated supplies power to trouble recorder motor M2001. Solenoid L2002 operated causes trouble recorder TRR to run at PLAY speed.

The speech announcement of the trouble recording is amplified by amplifier 441, the output of which is applied to the base of transistor Q5. The resulting signal from the emitter of transistor Q5 is applied to the receiver of the operator's headset HS for monitoring.

As trouble tape TT nears the end of the recording, FORWARD limit switch, shown schematically as break contact LF, operates, releasing relay ST and solenoid L2002. Relay ST released operates solenoid L2003 and opens the operate path for relay ST so that relay ST may not operate until REWIND limit switch transfer contacts LR operate.

Solenoid L2003 causes the tape supply spool (not shown) to be driven backwards, rewinding trouble tape TT. As the end of the tape is reached, a timer gear (not shown) operates, REWIND limit switch transfer contacts LR operate, releasing solenoid L2003, operating relay ST as before. Trouble recorder TRR continues repeating the PLAYBACK, automatically rewinding after each PLAYBACK until relay PB is released. Relay PB released releases relay ST, releases relay R and enables operation of relay TRF and solenoid L2001.

Relay ST released operates solenoid L2003, releases solenoid L2002 and opens the operate path for relay ST so that relay ST may not reoperate until transfer contacts LR of the REWIND limit switch are operated.

Relay R released disconnects RECORD-REPRODUCE head H2002 from the input of amplifier 441 and connects it to the dial pulse tone output of tone oscillator OSC5, combined with the output of amplifier 441, by the operation of transfer contacts $R_{41}$ and $R_{42}$. Solenoid L2002 released and solenoid L2003 operated causes the tape to rewind. As the end of the tape is reached, transfer contacts LR of the REWIND limit switch operate to release solenoid L2003 and to release relay M1.

Solenoid L2003 released allows trouble recorder TRR to stop. Relay M1 released removes power from trouble recorder motor M2001 by the release of make contact $M1_6$.

It is to be understood that the embodiment described herein is merely illustrative of the principles of the invention. Various modifications may be devised by persons skilled in the art without departing from the spirit and scope of the invention.

What is claimed is:

1. Apparatus for testing the electrical condition of a plurality of communication lines comprising, in combination, first recording means including a first recording track for recording a plurality of groups of signals thereon in accordance with a preassigned order, each of said groups comprising a sequence of pulse signals indicative of a particular one of said lines followed by voice signals indicative of said last named line, said first recording means further including a second recording track for recording thereon signal indicia of a preselected program for controlling the conduct of said testing, second recording means, means responsive to said first recording means for automatically testing each of said lines in accordance with said preselected program in said preassigned order excepting from said testing those of said lines in a busy condition, means responsive to a particular measure of impedance or to a busy condition on one of said lines by said last named means for recording a corresponding one of said voice signals from said first recording means on said second recording means and for recording on said second recording means an additional identifying signal adjacent to one of said voice signals to signify a busy condition on the corresponding one of said lines.

2. Apparatus in accordance with claim 1 including an oscillator, means for keying said oscillator for the generation of said signal indicia, means for keying said oscillator for the generation of said pulse signals in the form of oscillatory bursts, and means for keying said oscillator for the generation of said identifying signal.

3. In a telephone system, apparatus for automatically testing the electrical condition of a plurality of telephone lines comprising, in combination, means including first recording means for establishing a test program in accordance with a preselected sequential order of said lines, means for measuring at least one electrical condition of each of said lines, said first recording means including means for recording a first group of signal indicia each corresponding to a respective one of said lines and a second group of indicia each corresponding to a respective one of said lines, means responsive to said first group of indicia for connecting said measuring means to each of said lines in accordance with said preselected sequential order, second recording means, means responsive to a first preselected condition on any one of said lines as determined by said measuring means for recording a corresponding one of said indicia from said second group of indicia on said second recording means whereby upon the completion of said sequential order by said connecting means said second recording means has recorded thereon indicia of all of said lines conforming to said first preselected condition.

4. Apparatus in accordance with claim 3 including means responsive to a second preselected condition existing on one of said lines during the sequential operation of said connecting means for recording a corresponding one of said indicia from said second group of indicia on said second recording means and means responsive to said second preselected condition on said last named one of said lines during said sequential operation of said connecting means for recording on said second recording means adjacent said last named one of said indicia a signal indicative of the existence of said second condition.

5. In a telephone system, apparatus for automatically testing the electrical condition of a plurality of telephone lines comprising, in combination, means including first recording means for establishing a line testing program in accordance with a preselected sequential order of said lines, means for measuring the resistance of each of said lines, said first recording means including means for recording a group of signal indicia each corresponding to a respective one of said lines and a group of voice signals each corresponding to a respective one of said lines, means responsive to said group of signal indicia for connecting said measuring means to each of said lines in accordance with said preselected sequential order, second recording means, means responsive to a preselected resistance level on any one of said lines as determined by said measuring means for recording a corresponding one of said voice signals on said second recording means, whereby upon the completion of said sequential order by said connecting means said second recording means has recorded thereon voice signals identifying each of said lines exhibiting said preselected resistance level.

6. In a telephone system, apparatus for automatically testing the electrical condition of a plurality of telephone lines comprising, in combination, means including first recording means for establishing a line testing program in accordance with a preselected sequential order of said lines, means for measuring the resistance of each of said lines, means for generating dial signals corresponding to each of said lines and for recording said dial signals on said first recording means in accordance with said sequential order, means responsive to said dial signals, as record on said first recording means for connecting said measuring means to each of said lines in accordance with said preselected sequential order, means for recording a plurality of voice signals on said first recording means each identifying a particular one of said lines, second recording means, means responsive to a preselected resistance level on any one of said lines as determined by said measuring means for recording a corresponding one of said voice signals on said second recording means, and means responsive to a busy condition existing on one of said lines when said last named one of said lines is tested for recording a corresponding one of said voice signals on said second recording means and for recording a signal on said second recording means adjacent to said last named voice signal indicative of said busy condition.

7. Apparatus for testing the electrical condition of a plurality of communication lines comprising, in combination, a control station, first means for recording control signals indicative of a preselected program of operations involved in testing one of said lines, second means for recording a sequence of groups of pulse signals, each of said groups being indicative of a particular one of said lines, third means for recording a sequence of groups of voice signals each of said last named groups being indicative of a particular one of said lines, fourth recording means, means responsive to said second means for connecting each of said lines to said control station, sequentially, for a preassigned period, means responsive to said first means for testing the electrical condition of one of said lines during said preassigned period, means responsive to said last named means upon the determination of a particular electrical condition on one of said lines for recording on said fourth means from said third means that one of said groups of voice signals corresponding to said last named line, whereby upon the completion of a full sequential testing of all of said lines a series of voice announcements may be reproduced from said fourth means identifying each of said lines that exhibited said particular electrical condition.

8. Apparatus in accordance with claim 7 wherein said first means includes a first recording track in a first recorder-reproducer, wherein said second and third means include a second common recording track in said first recorder-reproducer, and wherein said fourth means includes a second recorder-reproducer.

9. In a telephone system employing pressurized cable and a plurality of means each responsive to a change in pressure of preselected magnitude occurring at a particular location for changing the impedance of a corresponding telephone line associated with said cable, automatic line testing apparatus comprising, in combination, a control center, a first recorder-reproducer having a first recording track for the recording of signals for controlling a preselected test program for each of said lines and a second recording track for the recording of a plurality of groups of signals thereon each of said groups including a series of pulses and a voice recording identifying a particular one of said lines, a second recorder-reproducer, means responsive to said signals on said second track for automatically establishing a connection successively between said control center and each of said telephone lines, means responsive to said signals on said first track for automatically conducting a test routine on each successive one of said lines, excepting lines in a busy condition, upon the establishment of a connection by said last named means, means operative upon the determination of a particular level of impedance on one of said lines by said last named means or upon the determination of a busy condition for recording on said second recorder-reproducer from said first recorder-reproducer one of said voice recordings identifying said last named one of said lines, and means responsive to said last named means for recording a distinctive signal on said second recorder-reproducer adjacent to one of said voice recordings to indicate a busy condition on the corresponding one of said lines.

10. Apparatus in accordance with claim 9 including an oscillator, first means for keying said oscillator for the generation of signals to be recorded on said first track, second means for keying said oscillator for the generation of signals to be recorded on said second track, and third means for keying said oscillator for the generation of one of said signals to indicate a busy condition.

11. Apparatus in accordance with claim 10 including means for checking the accuracy of signals recorded on said first and second tracks of said first recorder-reproducer.

No references cited.

KATHLEEN H. CLAFFY, *Primary Examiner.*

A. A. McGILL, *Assistant Examiner.*